US012634197B2

(12) United States Patent
Takakura et al.

(10) Patent No.: US 12,634,197 B2
(45) Date of Patent: *May 19, 2026

(54) USER EQUIPMENT, SERVER, AND METHODS THEREFOR

(71) Applicant: NEC Corporation, Tokyo (JP)

(72) Inventors: Tsuyoshi Takakura, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 18/293,014

(22) PCT Filed: Jun. 30, 2022

(86) PCT No.: PCT/JP2022/026150
§ 371 (c)(1),
(2) Date: Jan. 29, 2024

(87) PCT Pub. No.: WO2023/017693
PCT Pub. Date: Feb. 16, 2023

(65) Prior Publication Data
US 2024/0348495 A1 Oct. 17, 2024

(30) Foreign Application Priority Data
Aug. 10, 2021 (JP) ................................. 2021-130984

(51) Int. Cl.
*G06F 13/00* (2006.01)
*H04L 41/0806* (2022.01)
(52) U.S. Cl.
CPC ................................. *H04L 41/0806* (2013.01)

(58) Field of Classification Search
CPC ..... H04L 41/0806; H04L 67/02; H04L 67/10; H04L 67/34; H04L 67/55; H04L 67/168; H04W 84/04; H04W 92/04; H04W 76/10
USPC .......................................... 709/220–222, 223
See application file for complete search history.

(56) References Cited

U.S. PATENT DOCUMENTS

| 12,432,174 B2 * | 9/2025 | Ge ........................... H04W 4/40 |
| 2022/0174585 A1 * | 6/2022 | Ge ....................... H04L 61/4541 |
| 2024/0244033 A1 * | 7/2024 | Takakura .............. H04W 76/18 |
| 2024/0276567 A1 * | 8/2024 | Takakura .............. H04W 76/10 |
| 2024/0340832 A1 * | 10/2024 | Tamura ................. H04W 48/18 |

OTHER PUBLICATIONS

International Search Report for PCT Application No. PCT/JP2022/026150, mailed on Sep. 13, 2022.

(Continued)

*Primary Examiner* — Kenneth R Coulter
(74) *Attorney, Agent, or Firm* — Sughrue Mion, PLLC

(57) ABSTRACT

An edge enabler client (EEC) (2) of a User Equipment (UE) (1) receives from an edge configuration server (ECS) (7) a service provisioning notification containing edge data network (EDN) configuration information for accessing an EDN (4), and responds to the ECS (7) with a response message in response to receiving the service provisioning notification. For example, this can allow the ECS to know whether or not a service provisioning notification has been successfully received by the EEC of the UE in a Subscribe/Notify model based service provisioning procedure.

14 Claims, 12 Drawing Sheets

(56)          References Cited

OTHER PUBLICATIONS

3GPP TS 25.558 V17.0.0 (Jun. 2021), "3rd Generation Partnership Project; Technical Specification Group Services and System Aspects; Architecture for enabling Edge Applications; (Release 17)", Jun. 2021, pp. 1-157.

Samsung et al., Service offered by ECS and service provisioning API, 3GPP TSG-CT WG1 Meeting #130-e C1-213707, May 27, 2021, pp. 1-17.

Huawei, Change Request, Support Redirection for ECRControl APR, TSG-CT WG3 Meeting #114-e C3-211438, Mar. 5, 2021, pp. 1-6.

Technical Specification, 3rd Generation Partnership Project; Technical Specification Group Core Network and Terminals; T8 reference point for Northbound APIs; (Release 17), 3GPP TS 29.122 V17.2.0 (Jun. 2021), pp. 1-429.

Extended European Search Report for EP Application No. 22855757. 5, dated on Oct. 10, 2024.

Samsung et al., "Service offered by ECS and service provisioning API", 3GPP Draft; C1-213484, May 13, 2021.

3GPP TS 23.558 V2.0.0 (Mar. 2021), "3rd Generation Partnership Project; Technical Specification Group Services and System Aspects; Architecture for enabling Edge Applications; (Release 17)", Mar. 17, 2021, pp. 1-141.

* cited by examiner

RECEIVE EES REGISTRATION UPDATE REQUEST FROM EES-A   401

SEND EES REGISTRATION UPDATE RESPONSE TO EES-A CONTAINING FIRST INFORMATION FOR DETERMINING WHETHER OR NOT EDN CONFIGURATION INFORMATION NEEDS TO BE UPDATED   402

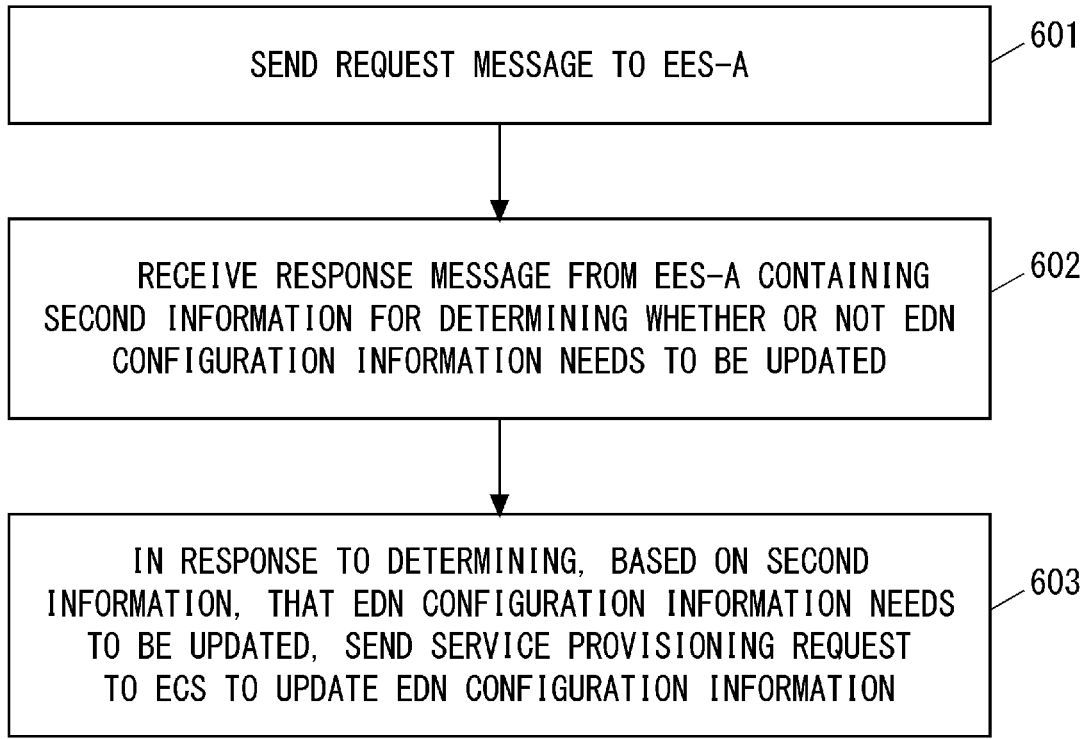

601 SEND REQUEST MESSAGE TO EES-A

602 RECEIVE RESPONSE MESSAGE FROM EES-A CONTAINING SECOND INFORMATION FOR DETERMINING WHETHER OR NOT EDN CONFIGURATION INFORMATION NEEDS TO BE UPDATED

603 IN RESPONSE TO DETERMINING, BASED ON SECOND INFORMATION, THAT EDN CONFIGURATION INFORMATION NEEDS TO BE UPDATED, SEND SERVICE PROVISIONING REQUEST TO ECS TO UPDATE EDN CONFIGURATION INFORMATION

Fig. 6

RECEIVE, FROM ECS, UPDATED LIST OF EDN CONFIGURATION
INFORMATION FOR ONE OR MORE EDNs                          ⌐901

REPLACE ENTIRE OLD LIST OF EDN CONFIGURATION
INFORMATION WITH UPDATED LIST                             ⌐902

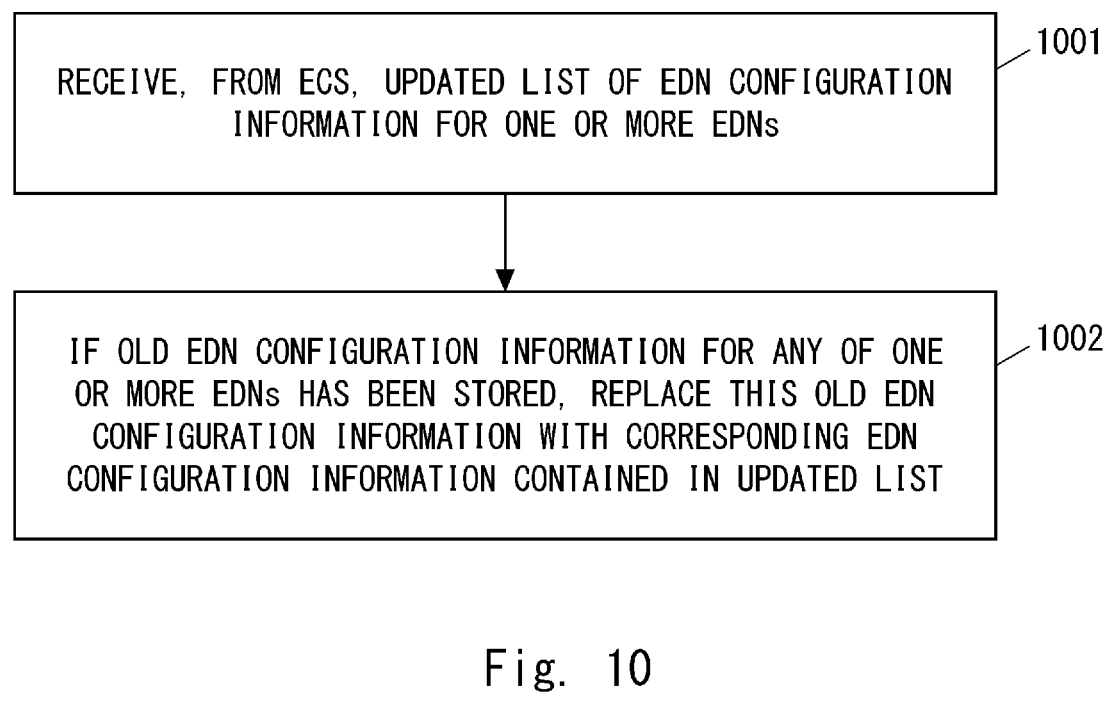

RECEIVE, FROM ECS, UPDATED LIST OF EDN CONFIGURATION INFORMATION FOR ONE OR MORE EDNs     1001

IF OLD EDN CONFIGURATION INFORMATION FOR ANY OF ONE OR MORE EDNs HAS BEEN STORED, REPLACE THIS OLD EDN CONFIGURATION INFORMATION WITH CORRESPONDING EDN CONFIGURATION INFORMATION CONTAINED IN UPDATED LIST     1002

Fig. 10

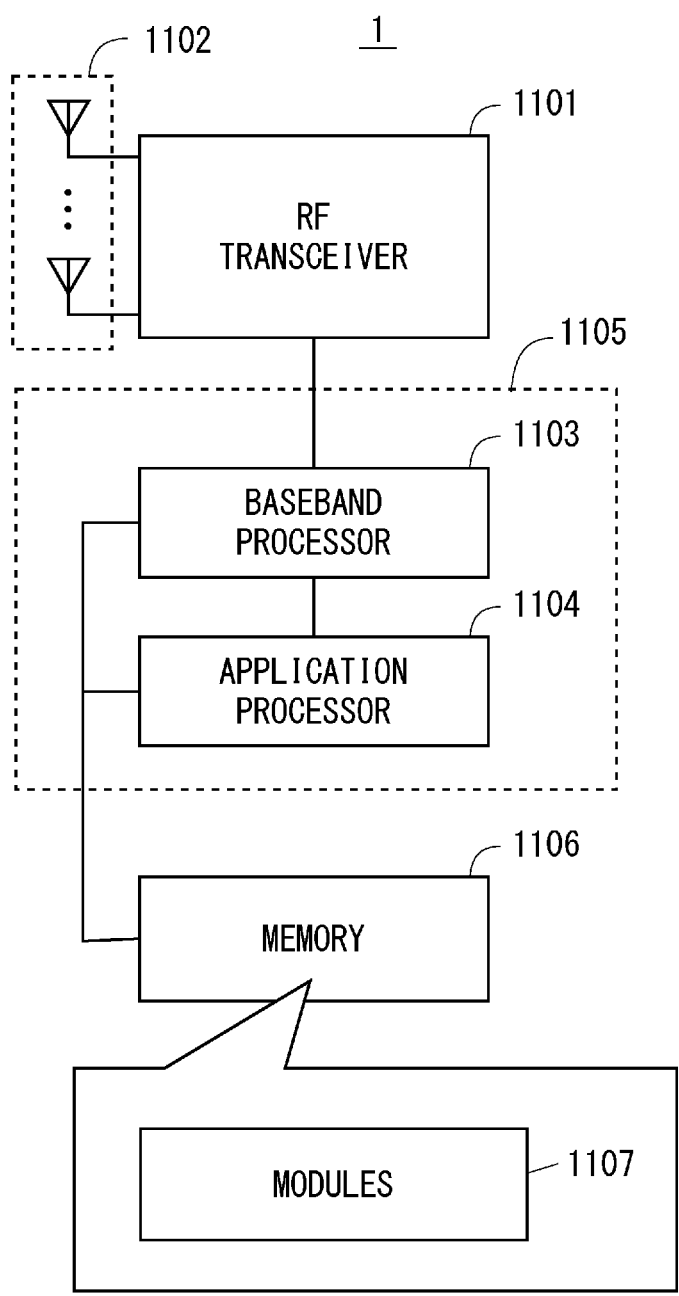
F i g. 11

5, 6, 7

USER EQUIPMENT, SERVER, AND METHODS THEREFOR

This application is a National Stage Entry of PCT/JP2022/026150 filed on Jun. 30, 2022, which claims priority from JP Patent Application 2021-130984 filed on Aug. 10, 2021, the contents of all of which are incorporated herein by reference, in their entirety.

TECHNICAL FIELD

The present disclosure relates to radio communication networks, and in particular to devices and methods for edge computing.

BACKGROUND ART

Edge computing aims to move applications, data, and computing power (services) from centralized points (e.g., centralized data centers) to locations closer to users (e.g., distributed data centers). The Industry Specification Group called Multi-access Edge Computing (MEC) of the European Telecommunications Standards Institute (ETSI) has standardized an application platform and APIs for edge computing. For example, MEC provides application developers and content providers with cloud computing capabilities and information technology (IT) service environments within a Radio Access Network (RAN) in close proximity to mobile subscribers. This environment provides ultra-low latency and high bandwidth, as well as direct access to radio network information (radio network information generation) (e.g., subscriber location and cell load) that can be leveraged by applications and services.

The Third Generation Partnership Project (3GPP (registered trademark)) SA6 working group is conducting standardization work on an architecture for enabling Edge Applications. (See, for example, Non-Patent Literature 1). This 3GPP architecture may be referred to as the EDGEAPP architecture. The EDGEAPP architecture provides a specification of an enabling layer to facilitate communication between application clients (ACs) running on a User equipment (UE) and applications deployed at the edge. According to the EDGEAPP architecture, edge applications provided by Edge Application Servers (EASs) are provided to ACs in a UE by an Edge Configuration Server (ECS) and an Edge Enabler Server (EES) through an Edge Enabler Client (EEC) of that UE.

An AC running on a UE needs to discover a server application (i.e., EAS in 3GPP SA6 terminology, or MEC application in ETSI ISG MEC terminology) on an Edge Cloud. The AC can use another client on the UE, i.e., the EEC, for discovery of the server application. The EEC provides ACs with discovery of available EASs in an Edge Data Network (EDN). An EDN is a local data network that supports an architecture for enabling edge applications. An EDN includes one or more EESs and one or more EASs.

A UE is initially provisioned by an ECS with configuration information required to connect to an EDN. More specifically, the EEC of the UE communicates with the ECS for service provisioning. Service provisioning allows the EEC to be configured with configuration information about available Edge Computing services, based on the UE's location, service requirements, and connectivity. This configuration information for an individual EDN is called EDN configuration information. The ECS provides the EEC with a list of EDN configuration information for one or more EDNs.

The EEC then selects an EES based on the EDN configuration information. The EEC performs a registration procedure, called EEC registration, with the EES to provide information that can be used by the EES in edge computing services. The EEC registration allows the EES to perform the creation (initialization), update and removal of information resources related to the EEC. The EEC registration also enables the sharing of EEC Context among entities (e.g., UE and Application Server) in the EDGEAPP architecture. The determination of whether or not EEC registration is permitted (EEC Registration Permit Decision) is based on the security credentials and/or at least one Application Client Profile (AC Profile(s)) provided by the EEC. For EEC registration, the EEC issues an EEC registration request to the EES.

In addition, the EEC can communicate with the EES and perform EAS discovery for ACs. EAS discovery allows the EEC to obtain information about available EASs of interest. Discovery of an EAS(s) is based on matching EAS discovery filters provided by the EEC. To perform EAS discovery, the EEC issues an EAS discovery request to the EES to obtain information about devices, connections, or configurations required to provide services on the EDN. This information includes, for example, information about available edge computing services and information about servers in the EDN.

CITATION LIST

Non Patent Literature

[Non-Patent Literature 1] 3GPP TS 23.558 V17.0.0 (2021-06) "3rd Generation Partnership Project; Technical Specification Group Services and System Aspects; Architecture for enabling Edge Applications; (Release 17)", June 2021

SUMMARY OF INVENTION

Technical Problem

The inventors have studied the EDGEAPP architecture and found various problems. One of these problems is that no response (e.g., acknowledge (ACK) or negative acknowledge (NACK)) to a service provisioning notification from an ECS to an EEC is specified in Non-Patent Literature 1. Specifically, according to Non-Patent Literature 1, the service provisioning procedures support the Request/Response model and the Subscribe/Notify model. The service provisioning procedure based on the Subscribe/Notify model involves a service provisioning subscription procedure and a service provisioning notification procedure. In the service provisioning subscription procedure, the EEC sends a service provisioning subscription request to the ECS. The ECS then processes the request and responds with a service provisioning subscription response if the request is processed successfully. In the service provisioning notification procedure, when an event occurs in the ECS that satisfies trigger conditions for updating the service provisioning of the subscribed EEC, the ECS sends to the EEC a service provisioning notification containing a list of EDN configuration information. However, according to Non-Patent Literature 1, the response (e.g., ACK, NACK) to a service provisioning notification from the ECS to the EEC is not specified. Therefore, the ECS cannot confirm whether the service provisioning notification was successful or not. In other words, the ECS cannot ensure that the EDN configuration information held by the ECS is in sync with the EDN configuration information configured (or stored or enabled) in the EEC.

Another one of the problems is that the ECS cannot promptly inform the EEC that the EDN configuration information (or list of EDN configuration information) needs to be updated in the service provisioning procedure based on the Request/Response model. Specifically, in the Service Provisioning Request/Response model, in response to receiving a service provisioning request from the EEC, the ECS sends a service provisioning response to the EEC containing a list of EDN configuration information. The EDN configuration information may include a Lifetime information element (IE). The EEC sends a service provisioning request to the EES when the lifetime of any previously received and cached EDN configuration information expires. The ECS can then send updated EDN configuration information to the EEC via a service provisioning response. However, until the lifetime of any cached EDN configuration information expires, the ECS cannot tell the EEC that the EDN configuration information (or list of EDN configuration information) needs to be updated.

Still another problem is that it is not clear how the EEC (or UE) stores (or caches) a list of EDN configuration information received from the ECS. Specifically, EDN configuration information includes, for a given EDN, the configurations required for the EEC to connect to the EDN. In the Service Provisioning Subscribe/Notify model, when an update event occurs to any EDN configuration information, the ECS can send updated EDN configuration information or an updated list of EDN configuration information to the EEC via a service provisioning notification. On the other hand, in the Service Provisioning Request/Response model, in response to a service provisioning request from the EEC, the ECS can send updated EDN configuration information or an updated list of EDN configuration information to the EEC via a service provisioning response. However, it is not clear whether the EEC should replace the entire old stored list of EDN configuration information with the newly received updated list of EDN configuration information from the ECS. In other words, it is not clear whether the ECS should selectively replace only the old EDN configuration information that corresponds to the new EDN configuration information in the updated list. Namely, it is not clear whether the (updated) list of EDN configuration information sent from the ECS to the EEC should always be a list of EDN configuration information for all EDNs to be configured in the EEC. In other words, it is not clear whether the (updated) list of EDN configuration information sent from the ECS to the EEC is only a list of updated EDN configuration information.

One of the objects to be attained by example embodiments disclosed herein is to provide apparatuses, methods, and programs that contribute to solving at least one of the above-described problems. It should be noted that this object is merely one of the objects to be attained by the example embodiments disclosed herein. Other objects or problems and novel features will be made apparent from the following description and the accompanying drawings.

Solution to Problem

In a first aspect, a UE includes a memory and at least one processor coupled to the memory. The at least one processor is configured to receive from an edge configuration server a service provisioning notification containing EDN configuration information for accessing an EDN. The at least one processor is configured to respond to the edge configuration server with a response message in response to receiving the service provisioning notification containing the EDN configuration information.

In a second aspect, a method performed by a UE includes: (a) receiving from an edge configuration server a service provisioning notification containing EDN configuration information for accessing an EDN; and (b) responding to the edge configuration server with a response message in response to receiving the service provisioning notification containing the EDN configuration information.

In a third aspect, an edge configuration server (ECS) includes a memory and at least one processor coupled to the memory. The at least one processor is configured to send to a UE a service provisioning notification containing EDN configuration information for accessing an EDN. The at least one processor is configured to receive a response message sent by the UE in response to the service provisioning notification containing the EDN configuration information.

In a fourth aspect, a method performed by an edge configuration server (ECS) includes: (a) sending to a UE a service provisioning notification containing EDN configuration information for accessing an EDN; and (b) receiving a response message sent by the UE in response to the service provisioning notification containing the EDN configuration information.

In a fifth aspect, an edge configuration server (ECS) includes a memory and at least one processor coupled to the memory. The at least one processor is configured to receive an EES registration update request from an EES. The at least one processor is configured to, in response to the EES registration update request, send to the EES an EES registration update response containing first information for determining whether or not EDN configuration information needs to be updated. The first information causes the EES to respond to a request message from an EEC of a UE with a response message containing second information for the EEC to determine whether or not the EDN configuration information needs to be updated.

In a sixth aspect, a method performed by an edge configuration server (ECS) includes: (a) receiving an EES registration update request from an EES; and (b) in response to the EES registration update request, sending to the EES an EES registration update response containing first information for determining whether or not EDN configuration information needs to be updated. The first information causes the EES to respond to a request message from an EEC of a UE with a response message containing second information for the EEC to determine whether or not the EDN configuration information needs to be updated.

In a seventh aspect, an EES includes a memory and at least one processor coupled to the memory. The at least one processor is configured to send an EES registration update request to an edge configuration server, and receive from the edge configuration server an EES registration update response containing first information for determining whether or not EDN configuration information needs to be updated. The at least one processor is also configured to receive a request message from an EEC of a UE and to respond to the request message with a response message containing second information for the EEC to determine whether or not the EDN configuration information needs to be updated. The second information causes the EEC to send a service provisioning request to the ECS to update the EDN configuration information.

In an eighth aspect, a method performed by an EES includes: (a) sending an EES registration update request to an edge configuration server; (b) receiving from the edge configuration server an EES registration update response containing first information for determining whether or not EDN configuration information needs to be updated; (c) receiving a request message from an EEC of a UE; and (d) responding to the request message with a response message containing second information for the EEC to determine whether or not the EDN configuration information needs to be updated. The second information causes the EEC to send a service provisioning request to the ECS to update the EDN configuration information.

In a ninth aspect, a UE includes a memory and at least one processor coupled to the memory. The at least one processor is configured to send a request message to an EES and to receive from the EES a response message containing second information for determining whether or not EDN configuration information needs to be updated. The at least one processor is also configured to, in response to determining, based on the second information, that the EDN configuration information needs to be updated, send a service provisioning request to an edge configuration server for updating the EDN configuration information.

In a tenth aspect, a method performed by a UE includes: (a) sending a request message to an EES; (b) receiving from the EES a response message containing second information for determining whether or not EDN configuration information needs to be updated; and (c) in response to determining, based on the second information, that the EDN configuration information needs to be updated, sending a service provisioning request to an edge configuration server for updating the EDN configuration information.

In an eleventh aspect, a UE includes a memory and at least one processor coupled to the memory. The at least one processor is configured to act as an EEC and to receive from an edge configuration server an updated list of EDN configuration information for one or more EDNs. The at least one processor is also configured to replace an entire old list of EDN configuration information already stored in the UE with the updated list.

In a twelfth aspect, a method performed by a UE includes: (a) acting as an EEC; (b) receiving from an edge configuration server an updated list of EDN configuration information for one or more EDNs; and (c) replacing an entire old list of EDN configuration information already stored in the UE with the updated list.

In a thirteenth aspect, a UE includes a memory and at least one processor coupled to the memory. The at least one processor is configured to act as an EEC and to receive from an edge configuration server an updated list of EDN configuration information for one or more EDNs. The at least one processor is also configured to, if old EDN configuration information for any of the one or more EDNs is stored in the UE, replace the old EDN configuration information with corresponding EDN configuration information included in the updated list.

In a fourteenth aspect, a method performed by a UE includes: (a) acting as an EEC; (b) receiving from an edge configuration server an updated list of EDN configuration information for one or more EDNs; and (c) if old EDN configuration information for any of the one or more EDNs is stored in the UE, replacing the old EDN configuration information with corresponding EDN configuration information included in the updated list.

In a fifteenth aspect, a program includes a set of instructions (software codes) that, when loaded into a computer, cause the computer to perform the method according to any of the second, fourth, sixth, eighth, tenth, twelfth, and fourteenth aspects described above.

Advantageous Effects of Invention

According to the above-described aspects, it is possible to provide apparatuses, methods, and programs that contribute to solving at least one of the above-mentioned problems.

BRIEF DESCRIPTION OF DRAWINGS

FIG. 6 is a flowchart showing an example of the operation of an EEC according to an example embodiment;

FIG. 10 is a flowchart showing an example of the operation of an EEC according to an example embodiment;

FIG. 11 is a block diagram showing an example configuration of a UE according to an example embodiment.

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

Each of the example embodiments described below may be used individually, or two or more of the example embodiments may be appropriately combined with one another. These example embodiments include novel features different from each other. Accordingly, these example embodiments contribute to attaining objects or solving problems different from one another and contribute to obtaining advantages different from one another.

The example embodiments presented below are described primarily for the 3GPP system (e.g., 5G system (5GS)). However, these example embodiments may be applied to other radio communication systems.

As used in this specification, "if" can be interpreted to mean "when", "at or around the time", "after", "upon", "in response to determining", "in accordance with a determination", or "in response to detecting", depending on the context.

First Example Embodiment

Figure 1:
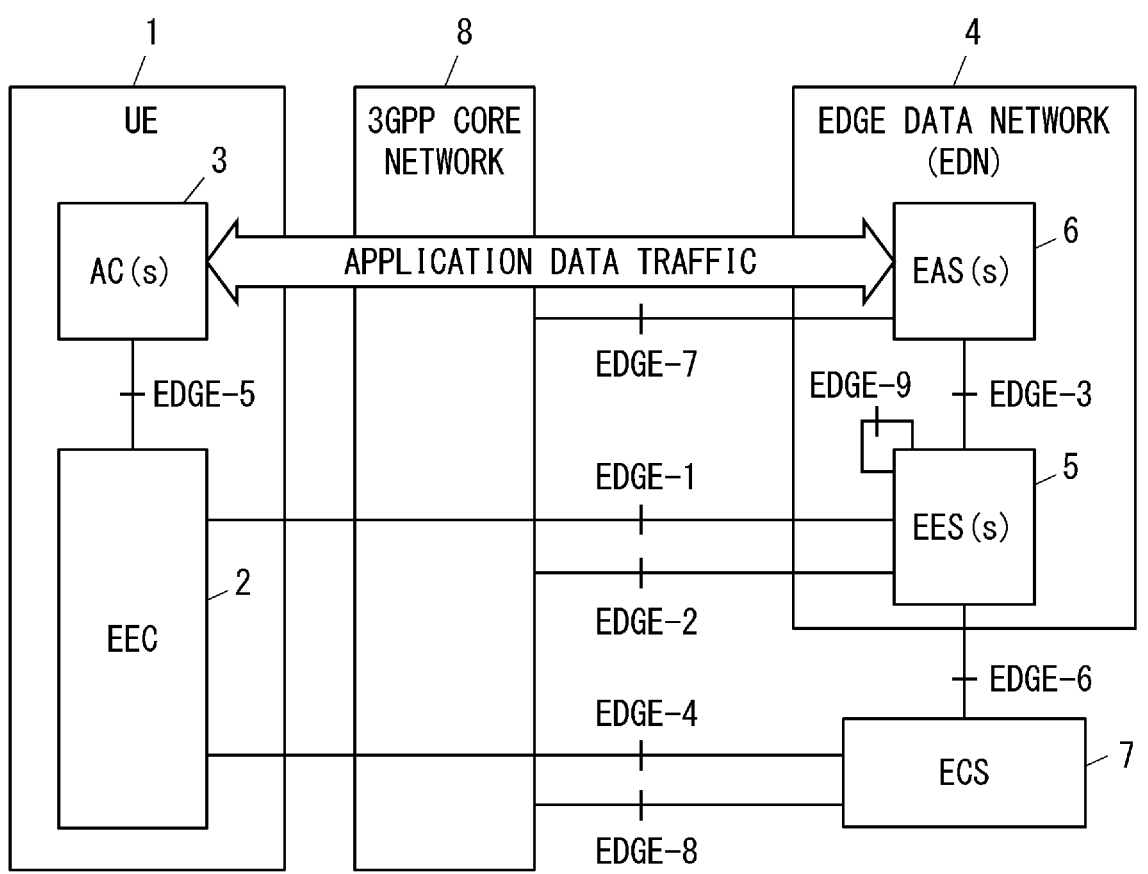
FIG. 1 shows an example of the architecture of a network according to an example embodiment.

FIG. 1 illustrates an example of the architecture of a network according to a plurality of example embodiments, including this example embodiment. The architecture in FIG. 1 corresponds to the 3GPP EDGEAPP architecture. Each of the elements shown in FIG. 1 is a functional entity that provides functions and interfaces as defined by the 3GPP. Each of the elements (functional entities) shown in FIG. 1 can be implemented, for example, as a network element on dedicated hardware, as a software instance running on dedicated hardware, or as a virtualized function instantiated on an application platform.

In the example in FIG. 1, a User Equipment (UE) 1 includes an Edge Enabler Client (EEC) 2 and one or more Application Clients (ACs) 3. In other words, an EEC 2 and one or more ACs 3 are deployed in the UE 1 and run on the UE 1. Although not explicitly shown in FIG. 1, the UE 1 communicates with a 3GPP core network 8 via an access network (e.g., Radio Access Network (e.g., NG Radio Access Network (NG-RAN))). In this way, the UE 1 provides the EEC 2 and the AC(s) 3 with connectivity to a data network via the access network and the 3GPP core network 8. The 3GPP core network 8 may be one or a combination of a 5G Core (5GC) and an Evolved Packet Core (EPC).

The EEC 2 provides supporting functions required by the AC(s) 3. Specifically, the EEC 2 provides provisioning of configuration information to enable the exchange of application data traffic with an Edge Application Server (EAS). In addition, the EEC 2 provides functionality for discovery of one or more EASs available within an Edge Data Network (EDN) 4. The EEC 2 uses EAS endpoint information obtained from the EAS discovery in routing of outgoing application data traffic to an EAS. The EEC 2 also provides functionality for EEC registration (i.e., registration, update, and de-registration) with one or more Edge Enabler Servers (EESs) 5.

Each AC 3 is an application running on the UE 1. Each AC 3 connects to one or more EASs to utilize edge computing services and exchanges application data traffic with the EASs.

The EDN 4 is a local data network that supports an architecture that enables edge applications. The one EDN 4 contains one or more EESs 5 and one or more EASs 6. The EDN 4 may be a Local Area Data Network (LADN). An LADN allows limited access to a DN (and its corresponding Data Network Name (DNN)) only in one or more specific areas. Outside of these areas, the UE 1 cannot access the corresponding DN (and DNN). An area where LADN DNN is available is called an LADN Service Area and is configured in the network as a set of Tracking Areas (TAs). DNNs that do not use LADN features do not have a LADN service area and are not restricted by these features. An LADN service area can be provided to the UE 1 by an Access and Mobility Management Function (AMF) in the 3GPP core network 8 when the UE 1 registers. This allows the UE 1 to know the area in which the LADN (or EDN) is available and not to attempt to access this LADN (or EDN) outside of this area.

Each EES 5 provides supporting functions required by one or more EASs 6 and the EEC 2. In particular, each EES 5 provides configuration information to the EEC 2, thereby enabling the EEC 2 to exchange application data traffic with an EAS(s) 6. Each EES 5 provides registration functionality (i.e., registration, update, and de-registration) of the EEC 2 and the EAS(s) 6. EEC registration allows the EES 5 to perform the creation (initialization), update, and removal of information resources associated with the EEC 2. With EEC registration, the EES 5 manages the EEC context of the EEC 2.

The EEC context contains information about the EEC 2 for receiving edge enabler services. Specifically, the EEC context can include an EEC context ID, source EES endpoint information, and a service session context. The EEC context ID is an identifier assigned to the EEC context. The source EES endpoint information is the endpoint address (e.g., one or both of a Uniform Resource Identifier (URI) and an Internet Protocol (IP) address) of an EES 5A that provided the EEC context. The service session context may include the identifier (EAS ID) of an EAS 6 that provides the application service and the endpoint information (e.g., one or both of a URI and an IP address) of that EAS 6.

Each EES 5 provides functionality for application context transfer between EASs. This functionality is required for edge application mobility (or application context relocation) for service continuity. Edge application mobility relocates the application context or application instance or both for a user (i.e., AC) from a source EAS (or EDN or LADN) to a target EAS (or EDN or LADN). Edge application mobility can be triggered by UE mobility events or non-UE mobility events. UE mobility events include, for example, intra-EDN UE mobility, inter-EDN UE mobility, and LADN-related UE mobility. Non-UE mobility events include, for example, EAS or EDN overload situations and EAS maintenance (e.g., graceful shutdown of an EAS).

Each EES 5 supports the functionality of an Application Programming Interface (API) invoker and API exposer. Each EES 5 may interact with the 3GPP core network 8 directly (e.g., via a Policy Control Function (PCF)) or indirectly (e.g., via a Network Exposure Function (NEF) or Service Capability Exposure Function (SCEF)) to access services and capabilities of network functions in the 3GPP core network 8. Each EES 5 may support external exposure of services and capabilities of 3GPP network functions to EAS(s) 6.

Each EAS 6 is located in the EDN 4 and performs server functions of an application. The server functions of an application can only be available at the edge. In other words, the server functions of an application may only be available as an EAS. However, the server functions of an application may be available both at the edge and in the cloud. In other words, the server functions of an application may be available as an EAS and also as an application server in the cloud. The term "cloud" here means a central cloud that is located further away from the UE 1 than the EDN 4. Accordingly, an application server in the cloud means a server deployed in a centralized location (e.g., a centralized data center). Each EAS 6 may consume or utilize 3GPP core network capabilities. Each EAS 6 may directly invoke 3GPP core network function APIs. Alternatively, each EAS 6 may consume or utilize 3GPP core network capabilities via the EES 5, or via a NEF or SCEF.

An Edge Configuration Server (ECS) 7 provides supporting functions required by the EEC 2 to connect to an EES(s) 5. In particular, the ECS 7 provides the provisioning of a list of EDN configuration information for one or more EDNs to the EEC 2. The EDN configuration information includes, for a given EDN (e.g., the EDN 4), the configurations required for the EEC 2 to connect to the EDN. Specifically, the EDN configuration information for the EDN 4 includes the identification (e.g., DNN or Access Point Name (APN)) of the EDN 4 and a list of one or more EESs 5.

More specifically, the EDN configuration information for the EDN 4 includes an "EDN connection information" IE and a "List of EESs" IE, and may also include a "Lifetime" IE. The EDN connection information IE specifies information required for EDN connection. The information required for EDN connection includes a DNN or an APN, and may also include at least one of Single-Network Slice Selection Assistance Information (S-NSSAI) or EDN Topological Service Area. S-NSSAI identifies a network slice. The List of EESs IE specifies a list of one or more EESs 5 in the EDN 4. The EES list includes the EES ID and EES endpoint (e.g., URI, Internet Protocol (IP) address, or both) for each EES. The EES list may include the EAS IDs of one or more EASs 6 associated with each EES. The EES list may include one or more DNAIs associated with each EES or each EAS. The Lifetime IE specifies the validity period of the EDN configuration information. In other words, the Lifetime IE indicates the time duration during which the EDN configuration information is valid and is kept stored or cached in the EEC 2 (or the UE 1).

In addition, the ECS 7 provides registration functionality (i.e., registration, update, and de-registration) of an EES(s) 5. The ECS 7 also supports API invoker and API exposer functionality. The ECS 7 may interact with the 3GPP core network 8 directly (e.g., via a PCF) or indirectly (e.g., via a NEF or SCEF) to access services and capabilities of network functions in the 3GPP core network 8. The ECS 7 may be deployed in the Mobile Network Operator (MNO) domain serving the 3GPP core network 8 or in a third-party domain by a service provider (e.g., an Edge Computing Service Provider (ECSP)).

The example configuration in FIG. 1 shows only representative elements for illustrative purposes. For example, the ECS 7 may be connected to multiple EDNs, including the EDN 4.

Figure 2:
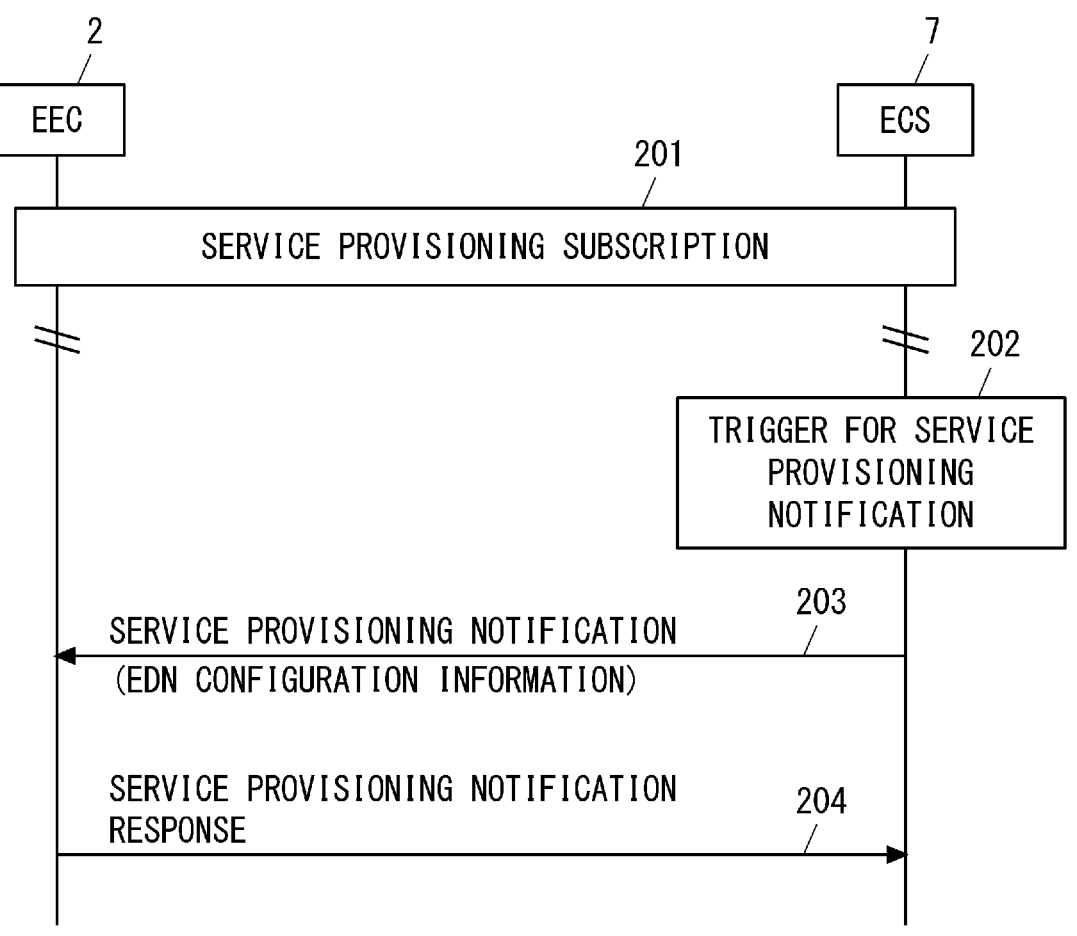
FIG. 2 is a sequence diagram showing an example of the operation of an EEC and an ECS according to an example embodiment.

FIG. 2 shows an example of the operation of the EEC 2 and the ECS 7 with respect to the service provisioning procedure based on the Subscribe/Notify model. The service provisioning procedure based on the Subscribe/Notify model involves a service provisioning subscription procedure and a service provisioning notification procedure. In step 201, the EEC 2 and the ECS 7 perform the service provisioning subscription procedure. Specifically, the EEC 2 sends a service provisioning subscription request to the ECS 7. The ECS 7 processes the request and responds to the EEC 2 with a service provisioning subscription response if the request was processed successfully.

Steps 202 to 204 relate to the service provisioning notification procedure. In step 202, the ECS 7 detects that an event has occurred on the ECS 7 that satisfies a trigger condition to update the service provisioning of the subscribed EEC 2. The ECS 7 determines the information to be provisioned, such as the identification (e.g., DNN/APN) of the EDN 4, the EDN topological service area, and the EES endpoints. In other words, the ECS 7 determines EDN configuration information for the EDN 4. The EDN configuration information for the EDN 4 includes information items required by the EEC 2 to access the EDN 4. The EDN configuration information for the EDN 4 includes at least a list of one or more EESs 5. More specifically, as described above, the EDN configuration information includes the identification (e.g., DNN or APN) of the EDN 4 and a list of one or more EESs 5. The ECS 7 may determine a list of EDN configuration information for multiple EDNs including the EDN 4.

In step 203, the ECS 7 sends a service provisioning notification to the EEC 2 that includes the EDN configuration information for the EDN 4 determined in step 202. In other words, the ECS 7 sends a service provisioning notification to the EEC 2 together with the EDN configuration information for the EDN 4 determined in step 202. The service provisioning notification may include a list of EDN configuration information for multiple EDNs, including the EDN 4.

In step 204, in response to receiving the service provisioning notification, the EEC 2 responds to the ECS 7 with a response message. In other words, the EEC 2 sends a response message to the ECS 7 in response to the service provisioning notification. The response message is referred to as, for example, but not limited to, a service provisioning notification response.

In an example, the response message may explicitly or implicitly indicate successful receipt of the service provisioning notification (or EDN configuration information or list of EDN configuration information). The EEC 2 may send the response message (e.g., ACK) in step 204 only if it has successfully received the service provisioning notification (or EDN configuration information or list of EDN configuration information). This response message may explicitly or implicitly indicate that the EDN configuration information (or list of EDN configuration information) has been successfully configured, stored, or cached in the EEC 2 (or the UE 1). The EEC 2 may only send the response message (e.g., ACK) of step 204 if the EDN configuration information (or list of EDN configuration information) has been successfully stored or cached. The response message may be a Hypertext Transfer Protocol (HTTP) response code "204 No Content". In this case, the ECS 7 may determine that the EEC 2 has not successfully received the service provisioning notification (or EDN configuration information or list of EDN configuration information) if it has not received the response message from the EEC 2.

In another example, the response message may indicate whether or not the service provisioning notification (or EDN configuration information or list of EDN configuration information) was successfully received. If the service provisioning notification (or EDN configuration information or list of EDN configuration information) was successfully received, the EEC 2 may send a response message (e.g., ACK) indicating successful receipt. On the other hand, if the reception of the service provisioning notification (or EDN configuration information or list of EDN configuration information) fails, the EEC 2 may send a response message (e.g., NACK) indicating a reception failure. The response message may indicate whether the EDN configuration information (or list of EDN configuration information) has been successfully configured, stored, or cached in the EEC 2 (or the UE 1). If the EEC 2 has successfully stored or cached the EDN configuration information (or list of EDN configuration information), it may send the response message (e.g., ACK) in step 204. On the other hand, if the EEC 2 has failed to configure, store, or cache the EDN configuration information (or list of EDN configuration information), it may send a response message (e.g., NACK) indicating a failure to configure, store, or cache. The response message indicating a failure to configure, store, or cache may indicate the cause of the failure (e.g., insufficient memory).

If the response message in step 204 has not been received, or if the response message in step 204 indicates a failure to configure, store, or cache, the ECS 7 may resend the service provisioning notification to the EEC 2. If the response message in step 204 indicates a failure to configure, store, or cache, the ECS 7 may send a service provisioning notification to the EEC 2 containing new EDN configuration information for the EDN 4 based on the cause of the failure. Alternatively, if the response message in step 204 indicates a failure, the ECS 7 may send a notification to the EEC 2 (or the UE 1) prompting the EEC 2 (or the UE 1) to send a service provisioning unsubscribe request. Upon receipt of this notification, the EEC 2 may send a service provisioning unsubscribe request to the ECS 7.

According to the operation of the EEC 2 and the ECS 7 described with reference to FIG. 2, in the service provisioning procedure based on the Subscribe/Notify model, the EEC 2 sends a response to a service provisioning notification to the ECS 7. This allows the ECS 7 to know whether or not the service provisioning notification (or EDN configuration information or list of EDN configuration information) has been successfully received by the EEC 2. In other words, this allows the ECS 7 to know whether the EDN configuration information held by the ECS 7 is in sync with the EDN configuration information configured (or stored or validated) in the EEC 2.

Figure 3:
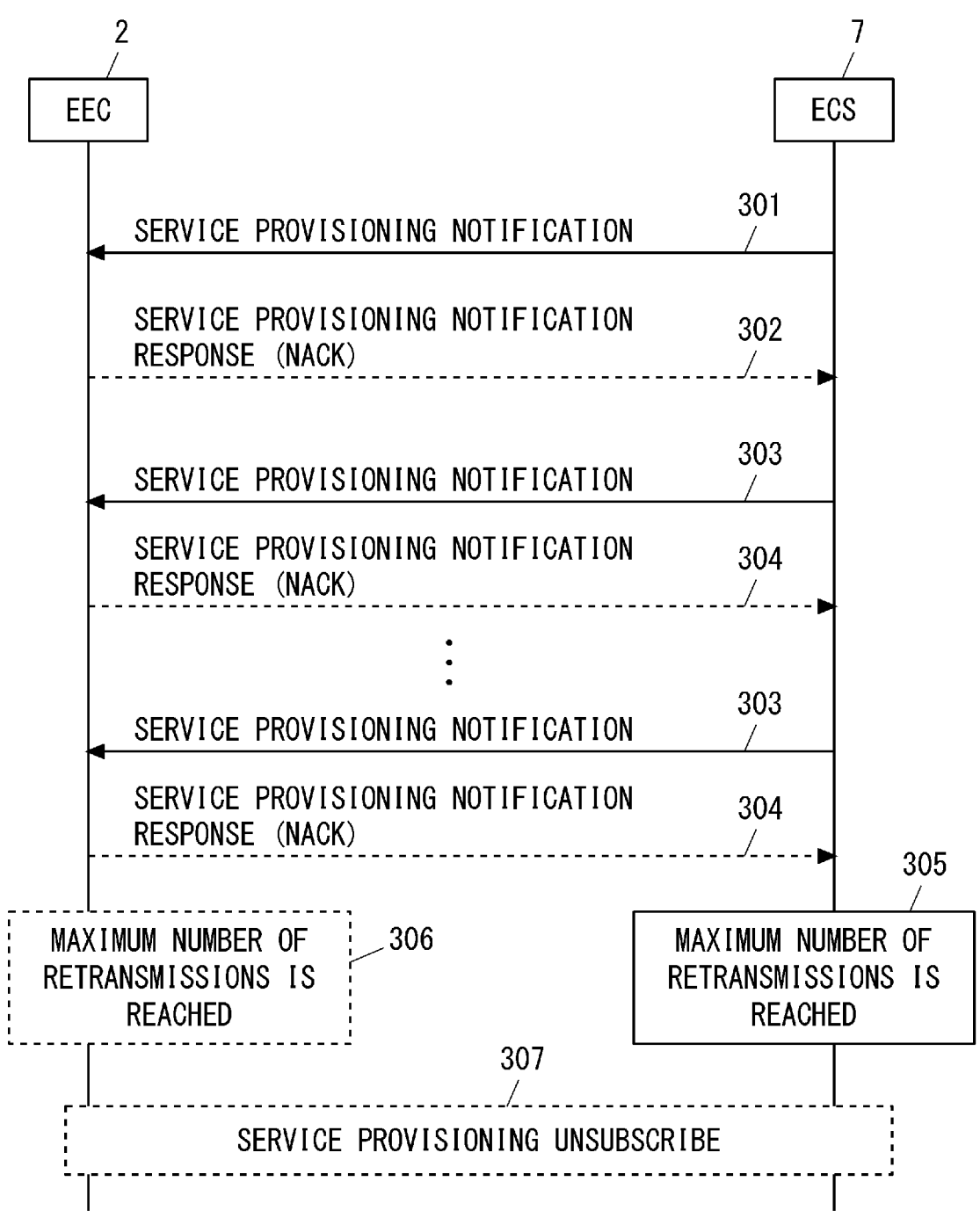
FIG. 3 is a sequence diagram showing an example of the operation of an EEC and an ECS according to an example embodiment.

FIG. 3 shows an example of the operation of the EEC 2 and the ECS 7 regarding the resending of a service provisioning notification. In step 301, the ECS 7 sends a service provisioning notification to the EEC 2. As already described, the service provisioning notification contains a list of EDN configuration information for one or more EDNs. In implementations in which the EEC 2 sends a NACK, the EEC 2 may send a response message to the ECS 7 indicating a NACK (step 302). On the other hand, in implementations in which the EEC 2 only sends ACKs, step 302 is omitted.

If no response message is received, or if the response message indicates a failure to receive (i.e., NACK), the ECS 7 resends the service provisioning notification to the EEC 2 (step 303). In implementations where the EEC 2 sends a NACK, the EEC 2 may send a response message to the ECS 7 indicating a NACK (step 304). On the other hand, in implementations where the EEC 2 only sends ACKs, step 304 is omitted.

In step 305, the ECS 7 detects that the number of retransmissions of the service provisioning notification has reached a predetermined maximum. In this case, the ECS 7 terminates the retransmission. In an example, the ECS 7 may send a notification to the EEC 2 (or the UE 1) prompting the EEC 2 (or the UE 1) to send a service provisioning unsubscribe request (step 307). Upon receipt of this notification, the EEC 2 may send a service provisioning unsubscribe request to the ECS 7 (step 307).

In implementations where the EEC 2 sends a NACK, the EEC 2 may detect that the number of retransmissions of the service provisioning notification has reached a predetermined maximum (step 306). In this case, the EEC 2 may send a service provisioning unsubscribe request to the ECS 7 (step 307).

Second Example Embodiment

An example of a network architecture for this embodiment is identical to the example described with reference to FIG. 1. This example embodiment provides improvements for the service provisioning procedure based on the Request/Response model.

Figure 4:
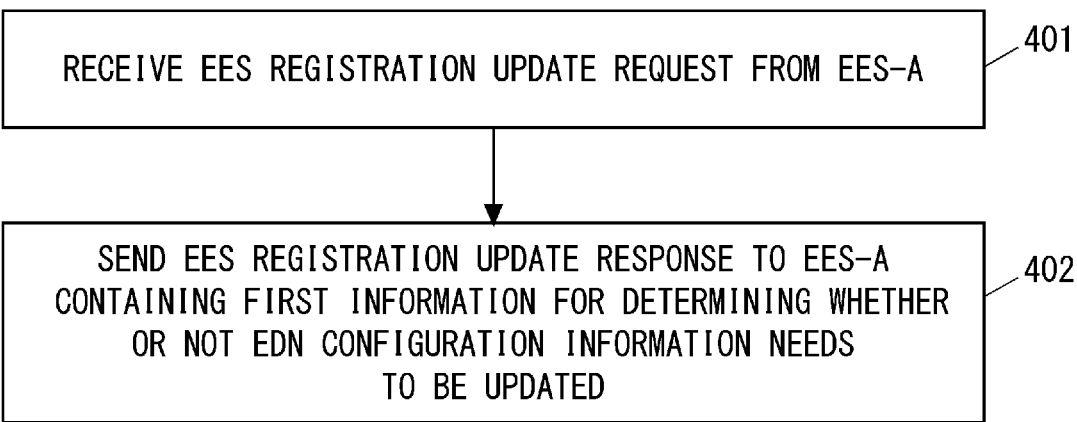
FIG. 4 is a flowchart showing an example of the operation of an ECS according to an example embodiment.

FIG. 4 shows an example of the operation of the ECS 7. In step 401, the ECS 7 receives an EES registration update request from an EES 5 (hereafter referred to as EES-A or EES 5A). The EES registration update procedure allows the EES 5A to provide information to the ECS 7 to enable the provisioning of the EES 5A to the EEC 2. The EES registration update procedure allows the EES 5A to update the ECS 7 when the information in the EES 5A changes. In response to the information (e.g., AC Profile(s)) of the EES 5A being updated, the EES 5A may send an EES registration renewal request to the ECS 7. Additionally or alternatively, the EES 5A may send an EES registration update request to the ECS 7 to maintain the active registration status before the expiration time of the EES registration has elapsed. The expiration time is indicated to the EES 5A by the last EES registration response or EES registration update response.

In step 402, the ECS 7 sends an EES registration update response to the EES 5A. The EES registration update response may indicate the expiration time of the EES registration. In addition, the EES registration update response in step 402 includes first information for determining whether or not the EDN configuration information (or list of EDN configuration information) needs to be updated. The first information causes the EES 5A to respond to a request message from the EEC 2 with a response message containing second information for the EEC 2 of the UE 1 to determine whether or not the EDN configuration information needs to be updated. In addition, the second information causes the EEC 2 to send a service provisioning request to the ECS 7 to update the EDN configuration information. In other words, the ECS 7 informs the EEC 2 via the EES SA that the EDN configuration information for the EDN 4 already configured in the EEC 2 needs to be updated and prompts the EEC 2 to send a service provisioning request.

The update of the EDN configuration information indicated by the first and second information need not relate to the EES 5A. For example, the update of the EDN configuration information indicated by the first and second information may relate to an EES (hereinafter referred to as EES-B or EES 5B) other than the EES 5A. The update of the EDN configuration information indicated by the first and second information may relate to an EDN other than the EDN 4.

Specifically, the ECS 7 may include the first information in the EES registration update response to the EES 5A in response to receiving the EES registration update request from the EES 5A after deregistration of the EES 5B has taken place. The deregistration of the EES 5B may result from the EES 5B being taken out of service, the EES 5B being deleted, or the EES 5B being shut down. The ECS 7 may deregister the EES 5B in response to receiving an EES deregistration request from the EES 5B. Alternatively, the ECS 7 may deregister the EES 5B in response to not receiving an EES registration update request from the EES 5B before the EES registration expiration time.

Additionally or alternatively, the ECS 7 may determine on a per-UE basis whether to include the first information in the EES registration update response to the EES 5A. In an example, the ECS 7 may include the first information in the EES registration update response to the EES 5A based on the location information of the UE 1. For example, if the ECS 7 detects, based on the location information of UE 1, that UE 1 has moved out of the service area of the EES 5B and determines that the EDN configuration information for that UE needs to be updated, the ECS 7 may include the first information in the EES registration update response to the EES SA. Note that the ECS 7 can obtain the location information of the UE 1 via a 3GPP core network function API (see Non-Patent Literature 1). In this case the EES 5B does not need to be deregistered from the ECS 7.

In another example, the ECS 7 may include the first information in the EES registration update response to the EES 5A based on the AC Profile of the UE 1. For example, consider the case where an EAS that has an EAS registration in the EES 5B and is included in (or matches) the AC Profile of the UE 1 has terminated its service, been deleted, shut down or deregistered from the EES 5B. In this case, the EES 5B sends an EES Profile that does not contain this EAS to the ECS 7 via an EES Registration Update Request. If the ECS 7 receives an EES registration update request and the EES Profile in this EES registration update request does not contain the EAS included in (or matching) the AC Profile of the UE 1, the ECS 7 determines that the EDN configuration information for the UE needs to be updated. his is because the EES 5B cannot provide the EAS that satisfies the AC Profile requirements of the UE 1, and therefore the EES 5B should be excluded from the EDN configuration information for that UE. The ECS 7 may then include the first information in the EES registration update response to the EES 5A.

The second information may be identical to the first information. That is, the EES 5A may forward the first information to the EEC 2 as the second information. Alternatively, the second information may be different from the first information. In this case, the EES 5A may derive the second information from the first information. The EES 5A may generate the second information by changing the format of the first information.

The first information and the second information may specify either or both the version and the release time and date of the EDN configuration information (or list of EDN configuration information). In this case, the EEC 2 determines whether the EDN configuration information (or list of EDN configuration information) stored in the EEC 2 is the latest based on the second information received from the EES 5A. If the EDN configuration information (or list of EDN configuration information) stored in the EEC 2 is not the latest, the EEC 2 sends a service provisioning request to the ECS 7 to update the EDN configuration information (or list of EDN configuration information).

Additionally or alternatively, the first information and the second information may contain an indication of an update of the EDN configuration information (or list of EDN configuration information). In this case, if the response message received from the EES 5A contains the second information, the EEC 2 sends a service provisioning request to the ECS 7 to update the EDN configuration information (or list of EDN configuration information).

The request message sent from the EEC 2 to the EES 5A and the response message (including the second information) sent from the EES 5A to the EEC 2 are not limited. The request message may be an EEC registration request, an EEC registration update request, or an EAS discovery request. On the other hand, the response message may be an EEC registration response, an EEC registration update response, or an EAS discovery response.

The EES registration update response in step 402 may include additional information indicating one or more EECs or UEs associated with the first information. The additional information may indicate a list of EECIDs, a list of UE identifiers (e.g., Generic Public Subscription Identifiers (GPSIs)), or a list of Subscription IDs. The additional information is used by the EES SA to determine whether the second information should be included in the response message to the EEC 2. Specifically, if the EEC 2 has been associated with the first information, the EES 5A includes the second information in the response message to the EEC 2. Conversely, if the EEC 2 has not been associated with the first information, the EES 5A does not include the second information in the response message to the EEC 2. Note that the ECS 7 knows which EES(s) are configured for each EEC. Thus, the ECS 7 can identify the EECs that have been provisioned by the EES list containing the deregistered EES 5B.

Figure 5:
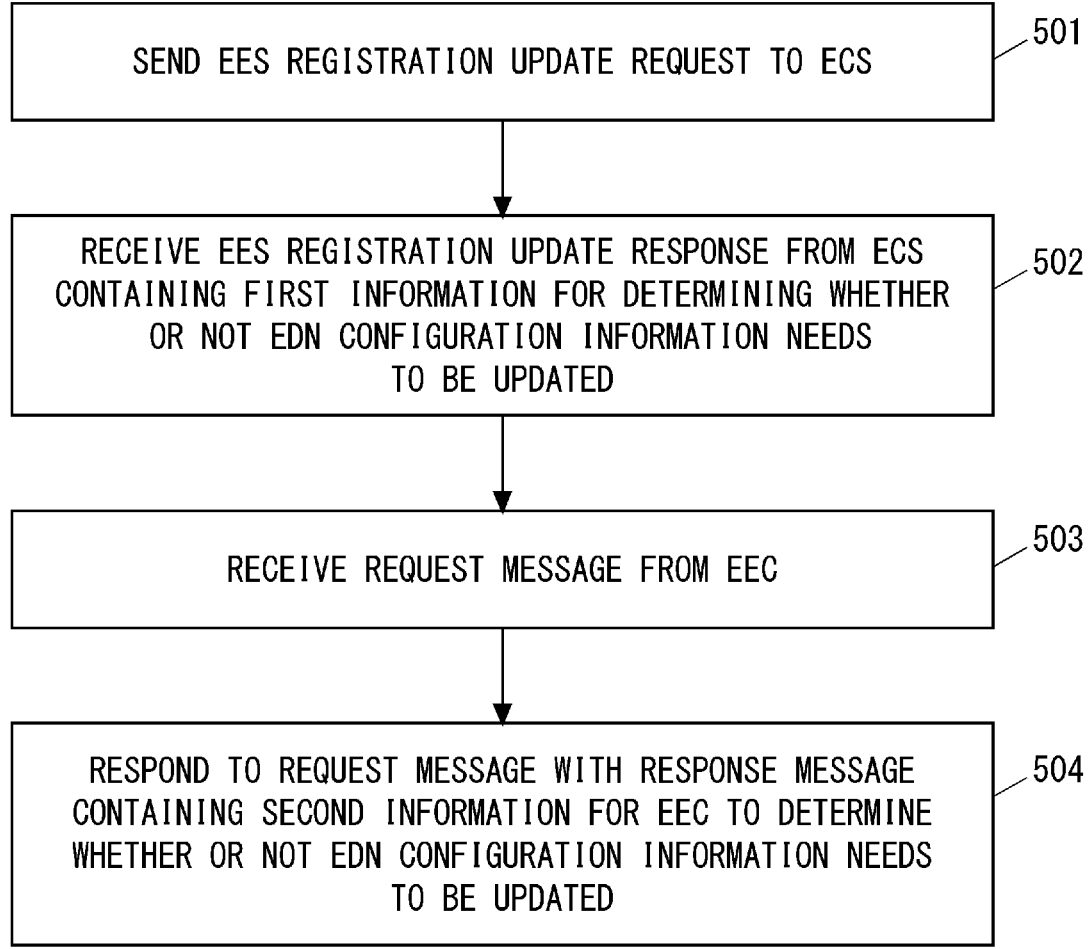
FIG. 5 is a flowchart showing an example of the operation of an EES according to an example embodiment.

FIG. 5 is a flowchart showing an example of the operation of the EES-A (EES 5A). The operation in FIG. 5 is performed by EES 5A, corresponding to the operation of the ECS 7 described with reference to FIG. 4. In step 501, the EES 5A sends an EES registration update request to the ECS 7. The EES 5A may send the EES registration update request to the ECS 7 in response to information (e.g., AC Profile(s)) being updated in the EES 5A. Additionally or alternatively, the EES 5A may send the EES registration update request to the ECS 7 to maintain the active registration status before the EES registration expiration time expires. The expiration time is indicated to the EES 5A by the last EES registration response or EES registration update response.

In step 502, the EES SA receives an EES registration update response from the ECS 7. The EES registration update response may indicate the expiration time of the EES registration. In addition, the EES registration update response contains first information for determining whether or not EDN configuration information (or a list of EDN configuration information) needs to be updated.

In step 503, the EES 5A receives a request message from the EEC 2. The request message may be an EEC registration request, an EEC registration update request, or an EAS discovery request.

In step 504, the EES 5A responds to the request message of step 503 with a response message containing second information for the EEC 2 to determine whether or not the EDN configuration information needs to be updated. The EES 5A may send the second information to the EEC 2 together with the response message. The response message may be an EEC registration response, an EEC registration update response, or an EAS discovery response.

The uses, details, and specific examples of the first and second information are the same as those described with respect to FIG. 4. The EES registration update response of step 502 may include additional information indicating one or more EECs or UEs associated with the first information. The use, details, and specific examples of this additional information are the same as those described with respect to FIG. 4.

FIG. 6 is a flowchart showing an example of the operation of the EEC 2. The operation in FIG. 6 is performed by the EEC 2, corresponding to the operation of the ECS 7 and the EES 5A described with reference to FIGS. 4 and 5. In step 601, the EEC 2 sends a request message to the EES 5A. The request message may be an EEC registration request, an EEC registration update request, or an EAS discovery request. In step 602, the EEC 2 receives a response message from the EES 5A containing second information for the EEC 2 to determine whether the EDN configuration information needs to be updated. The EEC 2 may receive the second information from the EES 5A along with the response message. The response message may be an EEC registration response, an EEC registration update response, or an EAS discovery response.

In step 603, the EEC 2 sends a service provisioning request to the ECS 7 to update the EDN configuration information (or list of EDN configuration information) in response to determining, based on the second information, that the EDN configuration information (or list of EDN configuration information) needs to be updated. Specifically, when the EEC 2 determines, based on the second information, that the EDN configuration information (or list of EDN configuration information) needs to be updated, the EEC 2 sends a service provisioning request to the ECS 7 without waiting for the lifetime of the EDN configuration information (or list of EDN configuration information) stored in the EEC 2 (or the UE 1) to expire.

The uses, details, and specific examples of the second information are the same as those described with respect to FIG. 4. Specifically, in an example, the second information may indicate one or both of the version and the release date and time of the EDN configuration information (or list of EDN configuration information). In this case, based on the second information received from the EES 5A, the EEC 2 determines whether the EDN configuration information (or list of EDN configuration information) stored in the EEC 2 is the latest. If the EDN configuration information (or list of EDN configuration information) stored in the EEC 2 is not the latest, the EEC 2 sends a service provisioning request to the ECS 7 to update the EDN configuration information (or list of EDN configuration information).

Additionally or alternatively, the second information may contain an indication of an update of the EDN configuration information (or list of EDN configuration information). In this case, if the response message received from EES 5A contains the second information, the EEC 2 sends a service provisioning request to the ECS 7 to update the EDN configuration information (or list of EDN configuration information).

Figure 7:
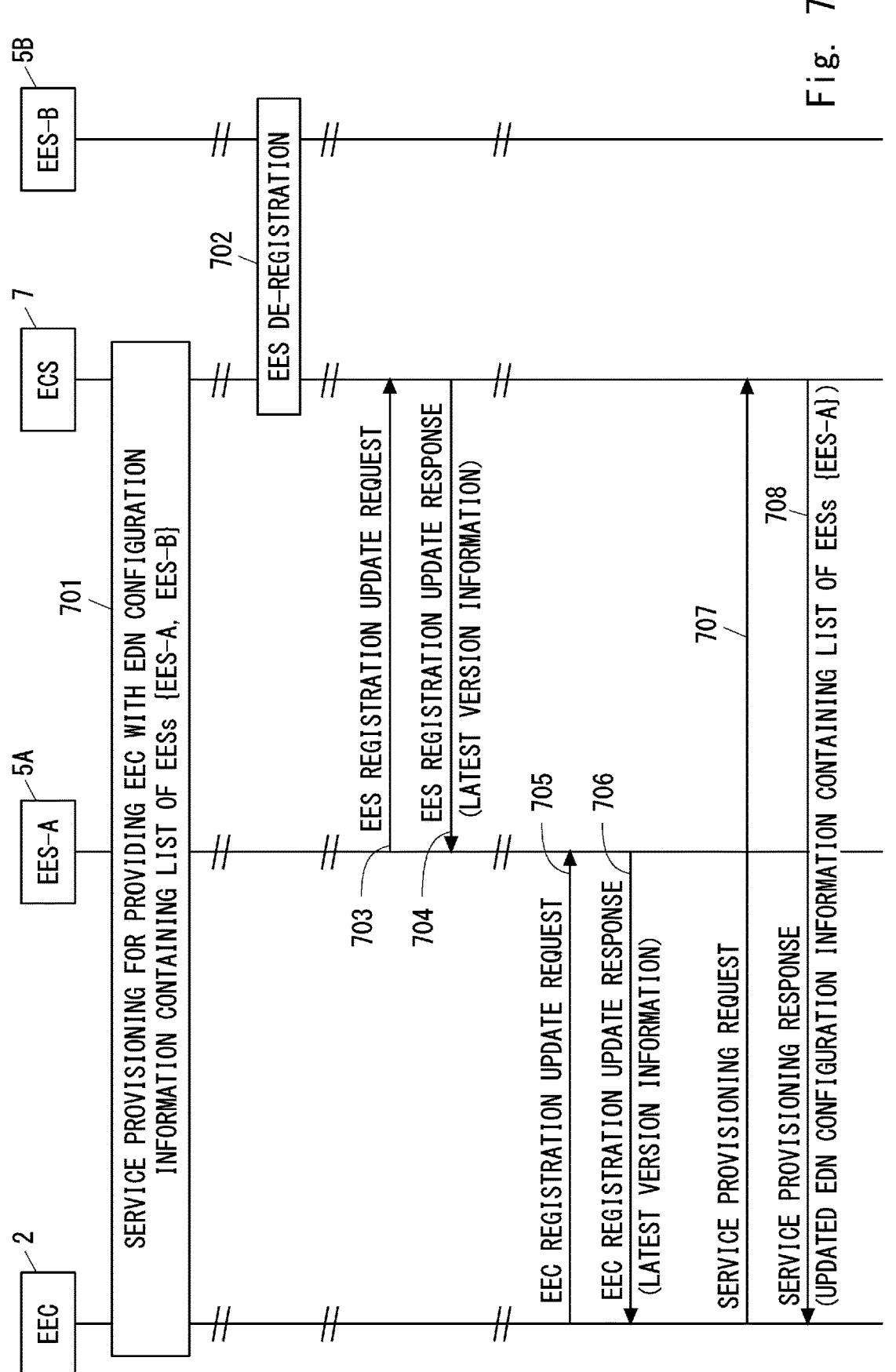
FIG. 7 is a sequence diagram showing an example of the operation of an EEC, an EES, and an ECS according to an example embodiment.

FIG. 7 is a sequence diagram showing an example of the operation of the EEC 2, the EES 5A, the EES 5B, and the ECS 7. Although not explicitly shown in FIG. 7, it is assumed that both the EES 5A and EES 5B have completed their EES registration with the ECS 7. In step 701, the EEC 2 and the ECS 7 perform a service provisioning procedure based on the Request/Response model. Specifically, the EEC 2 sends a service provisioning request to the ECS 7. The ECS 7 responds to the EEC 2 with a service provisioning response containing EDN configuration information for the EDN 4. The EDN configuration information for EDN 4 includes a list of EESs, including EES 5A and EES 5B.

Next, in step 702, the ECS 7 deregisters the EES 5B. Deregistration of the EES 5B can be caused by the EES 5B being out of service, the EES 5B being deleted, or the EES 5B being shut down. The ECS 7 can deregister the EES 5B in response to an EES deregistration request from the EES 5B. Alternatively, the ECS 7 can deregister the EES 5B in response to not receiving an EES registration update request from the EES 5B prior to the EES registration expiration time.

Then, in step 703, the EES 5A sends an EES registration update request to the ECS 7. The EES 5A may send the EES registration update request to the ECS 7 in response to information (e.g., AC Profile(s)) being updated in the EES 5A. Additionally or alternatively, the EES 5A may send the EES registration update request to the ECS 7 to maintain the active registration status before the EES registration expiration time expires. The expiration time is indicated to the EES 5A by the last EES registration response or EES registration update response.

In step 704, the ECS 7 sends an EES registration update response to the EES 5A. The EES registration update response may indicate the EES registration expiration time. In addition, the EES registration update response of step 704 includes first information for determining whether or not the EDN configuration information for the EDN 4 needs to be updated. In the example shown in FIG. 7, the first information is the latest version of the EDN configuration information.

In step 705, the EEC 2 sends a request message to the EES 5A. In the example shown in FIG. 7, the request message is an EEC registration update request. Alternatively, the request message may be an EEC registration request or an EAS discovery request.

In step 706, the EES 5A responds to the request message of step 705 with a response message containing second information that allows the EEC 2 to determine whether the EDN configuration information for the EDN 4 needs to be updated. In the example in FIG. 7, the response message is an EEC registration update response. Alternatively, the request message may be an EEC registration response or an EAS discovery response. In addition, in the example in FIG. 7, the second information is the latest version of the EDN configuration information.

Alternatively, in step 705, the EEC 2 may send a request message containing third information to the EES 5A. The third information may indicate one or both of the version and the release date and time of the EDN configuration information (or list of EDN configuration information) held by the EEC 2. Alternatively, the third information may indicate a request for the latest version of the EDN configuration information. In this case, the EES 5A determines whether the EDN configuration information for the EDN 4 needs to be updated by considering the third information. The EES 5A responds to the request message of step 705 with a response message containing the second information only if it determines that updating the EDN configuration information for EDN 4 is necessary.

In step 707, the EEC 2 determines whether the EDN configuration information for the EDN 4 stored in the EEC 2 is the latest, based on the latest version information received from the EES 5A. If the EDN configuration information stored in the EEC 2 is not the latest, the EEC 2 sends a service provisioning request to the ECS 7 to update the EDN configuration information without waiting for the lifetime of the EDN configuration information for the EDN 4 stored in the EEC 2 (or in the UE 1) to expire.

In step 708, the ECS 7 sends a service provisioning response to the EEC 2. The service provisioning response includes updated EDN configuration information for the EDN 4. Specifically, the updated EDN configuration information for the EDN 4 includes a list of EESs that include the EES 5A but do not include the EES 5B.

Figure 8:
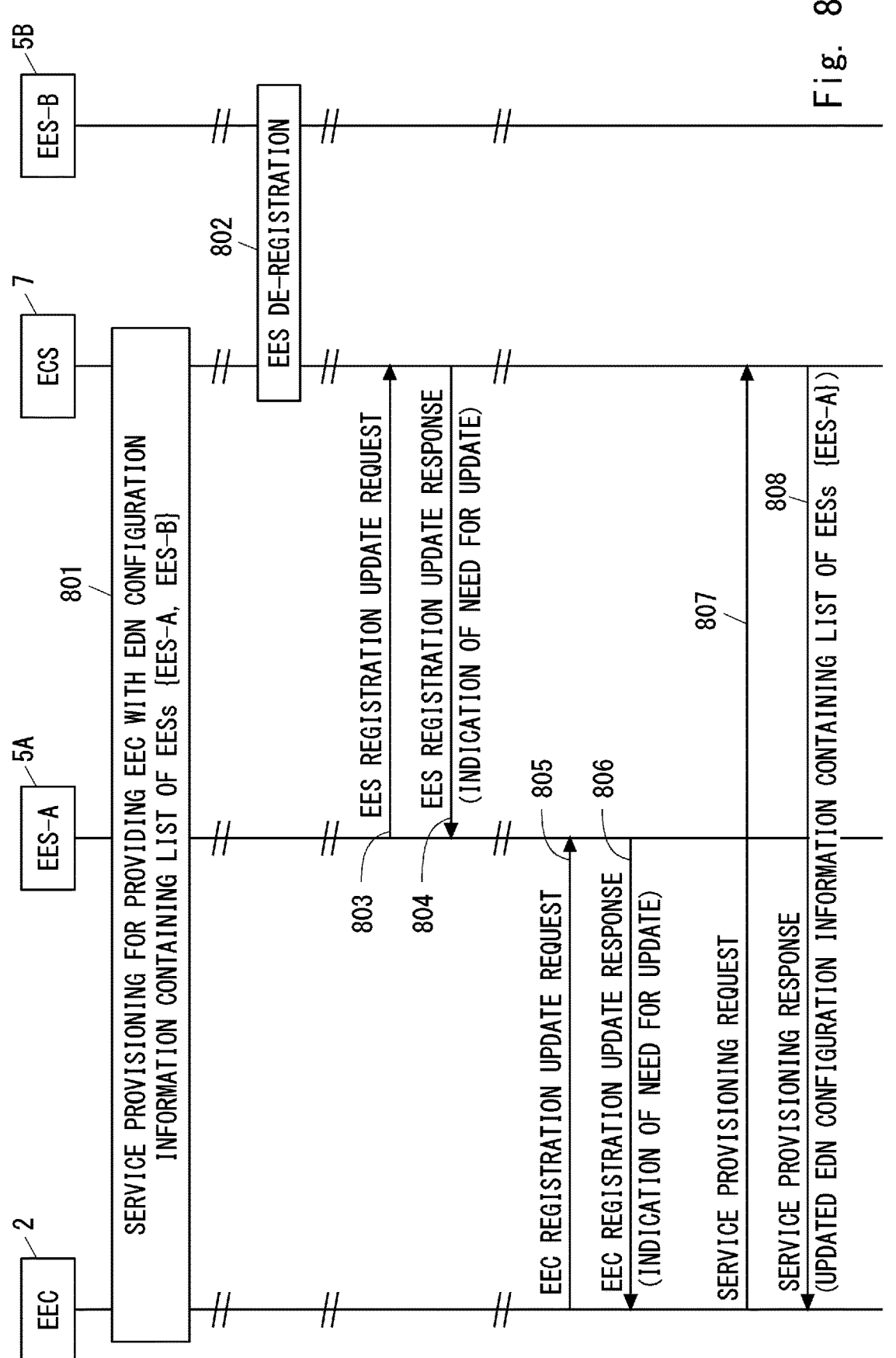
FIG. 8 is a sequence diagram showing an example of the operation of an EEC, an EES, and an ECS according to an example embodiment.

FIG. 8 is a sequence diagram showing an example of the operation of the EEC 2, the EES SA, the EES 5B, and the ECS 7. Steps 801 to 803 are similar to steps 701 to 703 in FIG. 7. Step 804 is also basically similar to step 704 in FIG. 7. However, in the example in FIG. 8, the EES registration update response in step 804 includes an indication of the need to update the EDN configuration information for the EDN 4.

Step 805 is similar to step 705 in FIG. 7. Step 806 is also similar in principle to step 706 in FIG. 7. However, in the example in FIG. 8, the response message (e.g., EEC registration update response) in step 806 includes an indication of the need to update the EDN configuration information for the EDN 4.

In step 807, the EEC 2 determines whether the response message of step 806 contains an indication of the need to update the EDN configuration information for the EDN 4. If the response message contains such an indication, the EEC 2 sends a service provisioning request to the ECS 7 for updating the EDN configuration information. The EEC 2 sends the service provisioning request to the ECS 7 without waiting for the lifetime of the EDN configuration information for the EDN 4 stored in the EEC 2 (or in the UE 1) to expire. Step 808 is similar to step 708 in FIG. 7.

According to the operation of the EEC 2, the EES 5A, and the ECS 7 described in this example embodiment, the ECS 7 informs the EEC 2 via the EES 5A that the EDN configuration information for the EDN 4 already configured in the EEC 2 needs to be updated, thereby prompting the EEC 2 to send a service provisioning request. This allows the ECS 7 to promptly inform the EEC 2 that the EDN configuration information (or list of EDN configuration information) needs to be updated in the service provisioning procedure based on the Request/Response model.

Third Example Embodiment

An example of a network architecture for this embodiment is identical to the example described with reference to FIG. 1. This example embodiment provides details of how a list of EDN configuration information is stored by the EEC 2 (or the UE 1).

Figure 9:
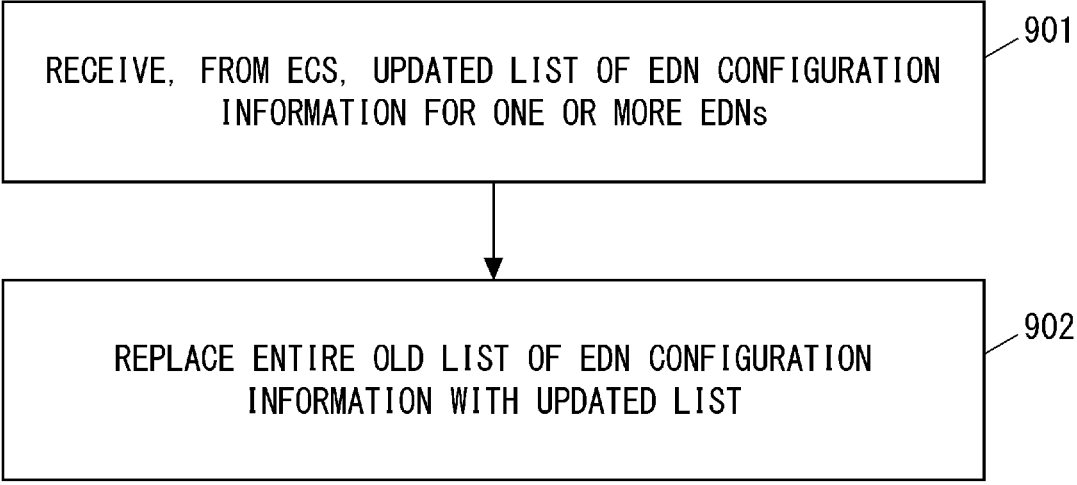
FIG. 9 is a flowchart showing an example of the operation of an EEC according to an example embodiment.

FIG. 9 shows an example of the operation of the EEC 2. In step 901, the EEC 2 receives from the ECS 7 an updated list of EDN configuration information for one or more EDNs. The EEC 2 may receive the updated list via a service provisioning notification in a service provisioning procedure based on the Subscribe/Notify model. Alternatively, the EEC 2 may receive the updated list via a service provisioning response in a service provisioning procedure based on the Request/Response model.

In step 902, the EEC 2 replaces the entire old list of EDN configuration information already stored in the EEC 2 (or the UE 1) with the updated list. In an example, the EEC 2 may delete the old list and store (or cache) the updated list. More specifically, the EEC 2 may delete all stored (or cached) EDN configuration information items for one or more EDNs and store (or cache) new EDN configuration information items for one or more EDNs. In another example, the EEC 2 may invalidate the old list and store and validate the updated list. More specifically, the EEC 2 may invalidate all stored (or cached) EDN configuration information items for one or more EDNs and validate new EDN configuration information items for one or more EDNs.

For example, consider the case where the EEC 2 stores valid EDN configuration information for EDN #1 and EDN #2. If the updated list received from the ECS 7 contains only the EDN configuration information for EDN #2, the EEC 2 deletes the current (or old) EDN configuration information for EDN #1 and EDN #2 and stores the new EDN configuration information for EDN #2 instead. In another example, if the updated list received from the ECS 7 contains only the EDN configuration information for EDN #3, the EEC 2 deletes the current (old) EDN configuration information for EDN #1 and EDN #2 and stores the new EDN configuration information for EDN #3 instead.

After step 902, the EEC 2 may notify one or more ACs residing in the UE 1 of the EDN configuration update.

FIG. 10 shows another example of the operation of the EEC 2. Step 1001 is similar to step 901 in FIG. 9. Specifically, the EEC 2 receives from the ECS 7 an updated list of EDN configuration information for one or more EDNs.

In step 1002, if the current (or old) EDN configuration information for any of the one or more EDNs associated with the updated list has been stored (or cached) in the EEC 2 (or UE 1), the EEC 2 replaces that current (or old) EDN configuration information with the corresponding EDN configuration information contained in the updated list. In an example, the EEC 2 may selectively delete old EDN configuration information for the EDN(s) associated with the updated list and store (or cache) the corresponding EDN configuration information contained in the updated list. In another example, the EEC 2 may selectively invalidate the old EDN configuration information for the EDN(s) associated with the updated list, and store and validate the corresponding EDN configuration information contained in the updated list.

For example, consider the case where the EEC 2 stores valid EDN configuration information for EDN #1 and EDN #2. If the updated list received from the ECS 7 contains only the EDN configuration information for EDN #2, the EEC 2 selectively deletes the current (or old) EDN configuration information for EDN #2 and instead stores the new EDN configuration information for EDN #2. In another example, if the updated list received from the ECS 7 contains only the EDN configuration information for EDN #3, the EEC 2 additionally stores the new EDN configuration information for EDN #3. Meanwhile, the EEC 2 maintains the EDN configuration information for EDN #1 and EDN #2, which are not related to the update list, as stored in the EEC 2 (or UE 1).

After step 1002, the EEC 2 may notify one or more ACs residing in the UE 1 of the EDN configuration update.

The EEC 2 may identify the EDN to which the EDN configuration information is associated based on the EDN connection information contained in that EDN configuration information. The EDN connection information may include a DNN or an APN and may further include S-NSSAI (network slice information). Additionally or alternatively, the EDN connection information may include another identifier (e.g., EDNID) to uniquely identify the EDN.

According to the operation of the EEC 2 described in this example embodiment, it can be clarified how the EEC 2 (or UE 1) stores a list of EDN configuration information.

The operation of the EEC 2 (or UE 1) described in this example embodiment can be combined with the first or second example embodiments described above, as appropriate.

The following provides configuration examples of the UE 1, EES 5, EAS 6, ECS 7, and EES 51 according to the above-described example embodiments. FIG. 11 is a block diagram showing an example configuration of the UE 1. A Radio Frequency (RF) transceiver 1101 performs analog RF signal processing to communicate with RAN nodes. The RF transceiver 1101 may include a plurality of transceivers. The analog RF signal processing performed by the RF transceiver 1101 includes frequency up-conversion, frequency down-conversion, and amplification. The RF transceiver 1101 is coupled to an antenna array 1102 and a baseband processor 1103. The RF transceiver 1101 receives modulated symbol data (or OFDM symbol data) from the baseband processor 1103, generates a transmission RF signal, and supplies the transmission RF signal to the antenna array 1102. Further, the RF transceiver 1101 generates a baseband reception signal based on a reception RF signal received by the antenna array 1102 and supplies the baseband reception signal to the baseband processor 1103. The RF transceiver 1101 may include an analog beamformer circuit for beam forming. The analog beamformer circuit includes, for example, a plurality of phase shifters and a plurality of power amplifiers.

The baseband processor 1103 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame) (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1103 may include, for example, signal processing of Service Data Adaptation Protocol (SDAP), Packet Data Convergence Protocol (PDCP), Radio Link Control (RLC), Medium Access Control (MAC), and Physical (PHY) layers. The control-plane processing performed by the baseband processor 1103 may include processing of Non-Access Stratum (NAS) protocols, Radio Resource Control (RRC) protocols, MAC Control Elements (CEs), and Downlink Control Information (DCIs).

The baseband processor 1103 may perform Multiple Input Multiple Output (MIMO) encoding and pre-coding for beam forming.

The baseband processor 1103 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1104 described below.

The application processor 1104 is also referred to as a CPU, an MPU, a microprocessor, or a processor core. The application processor 1104 may include a plurality of processors (or processor cores). The application processor 1104 loads a system software program (Operating System (OS)) and various application programs (e.g., a call application, a WEB browser, a mailer, a camera operation application, and a music player application) from a memory 1106 or from another memory not shown and executes these programs, thereby providing various functions of the UE 1.

In some implementations, as represented by a dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. The SoC device may be referred to as a Large-Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store one or more software modules (computer programs) 1107 including instructions and data to perform the processing by the UE 1 described in the above example embodiments. In some implementations, the baseband processor 1103 or the application processor 1104 may load these software modules 1107 from the memory 1106 and execute the loaded software modules, thereby performing the processing of the UE 1 described in the above example embodiments with reference to the drawings.

The control-plane processing and operations performed by the UE 1 described in the above example embodiments can be realized by elements other than the RF transceiver 1101 and the antenna array 1102, i.e., realized by one or both of the baseband processor 1103 and the application processor 1104 and the memory 1106 storing the software modules 1107.

The operations performed by the EEC 2 and the AC(s) 3 of the UE 1 described in the above example embodiments can be realized by one or both of the baseband processor 1103 and the application processor 1104 and the memory 1106 storing the software modules 1107.

Figure 12:
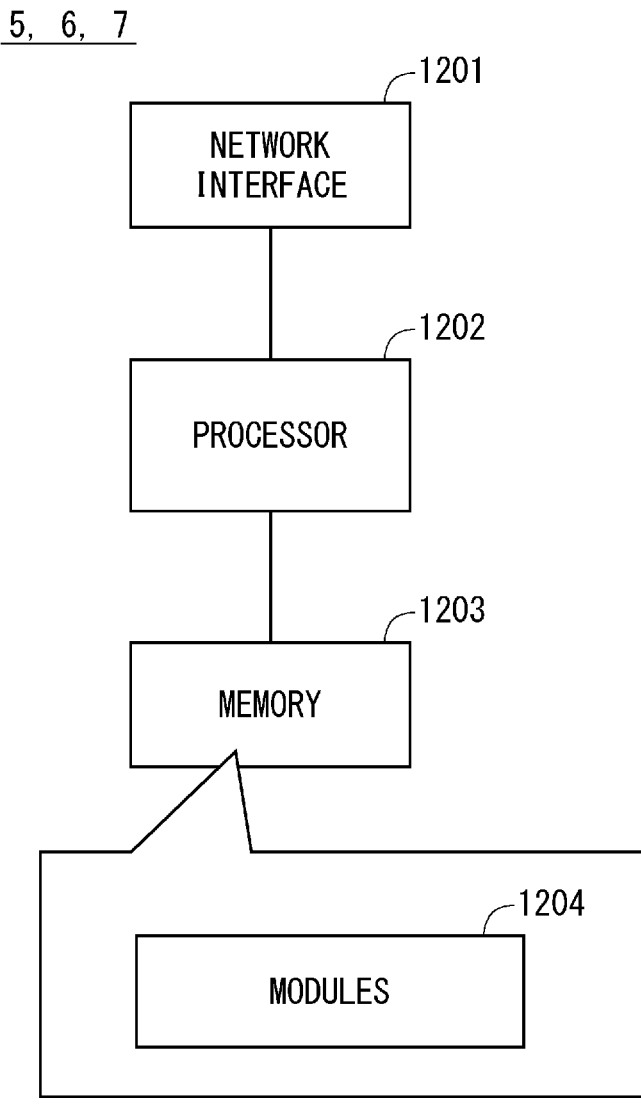
FIG. 12 is a block diagram showing an example configuration of a server according to an example embodiment.

FIG. 12 shows an example configuration of the EES 5 (EES 5A, EES 5B). The EAS 6 and the ECS 7 may also have the configuration as shown in FIG. 12. Referring to FIG. 12, the EES 5 (or EAS 6, or ECS 7) includes a network interface 1201, a processor 1202, and a memory 1203. The network interface 1201 is used to communicate with other network functions (NFs) or nodes. The network interface 1201 may include, for example, a network interface card (NIC) conforming to the IEEE 802.3 series.

The processor 1202 may be, for example, a microprocessor, a Micro Processing Unit (MPU), or a Central Processing Unit (CPU). The processor 1202 may include a plurality of processors.

The memory 1203 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1203 may include a storage located apart from the processor 1202. In this case, the processor 1202 may access the memory 1203 via the network interface 1201 or an I/O interface not shown.

The memory 1203 may store one or more software modules (computer programs) 1204 including instructions and data to perform the processing of the EES 5 (or EAS 6, or ECS 7) described in the above example embodiments. In some implementations, the processor 1202 may be configured to load the one or more software modules 1204 from the memory 1203 and execute the loaded software modules, thereby performing the processing of the EES 5 (or EAS 6, or ECS 7) described in the above example embodiments.

As described using FIGS. 11 and 12, each of the processors in the UE 1, EES 5, EAS 6, and ECS 7 according to the example embodiments described above can execute one or more programs, containing a set of instructions, to cause a computer to perform an algorithm described with reference to the drawings. Each of these programs contains a set of instructions (or software codes) that, when loaded into a computer, causes the computer to perform one or more of the functions described in the example embodiments. Each of these programs may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. Each program may be transmitted on a transitory computer readable medium or a communication medium. By way of example, and not limitation, transitory computer readable media or communication media can include electrical, optical, acoustical, or other form of propagated signals.

The above-described example embodiments are merely examples of applications of the technical ideas obtained by the inventors. These technical ideas are not limited to the above-described example embodiments and various modifications can be made thereto.

For example, the whole or part of the example embodiments disclosed above can be described as, but not limited to, the following supplementary notes.

Supplementary Note 1

A User Equipment (UE) comprising:
a memory; and
at least one processor coupled to the memory and configured to:
 receive from an edge configuration server a service provisioning notification containing edge data network (EDN) configuration information for accessing an EDN; and
 respond to the edge configuration server with a response message in response to receiving the service provisioning notification containing the EDN configuration information.

Supplementary Note 2

The UE according to Supplementary Note 1, wherein the response message indicates successful receipt of the EDN configuration information.

Supplementary Note 3

The UE according to Supplementary Note 1, wherein the response message indicates whether or not the EDN configuration information was successfully received.

Supplementary Note 4

The UE according to Supplementary Note 1, wherein the response message indicates whether or not the EDN configuration information has been successfully configured or stored in the UE.

Supplementary Note 5

The UE according to any one of Supplementary Notes 1 to 4, wherein the EDN configuration information contains a list of one or more edge enabler servers of the corresponding EDN.

Supplementary Note 6

A method performed by a User Equipment (UE), the method comprising:
receiving from an edge configuration server a service provisioning notification containing edge data network (EDN) configuration information for accessing an EDN; and
responding to the edge configuration server with a response message in response to receiving the service provisioning notification containing the EDN configuration information.

Supplementary Note 7

A program for causing a computer to perform a method for a User Equipment (UE), the method comprising:
receiving from an edge configuration server a service provisioning notification containing edge data network (EDN) configuration information for accessing an EDN; and
responding to the edge configuration server with a response message in response to receiving the service provisioning notification containing the EDN configuration information.

Supplementary Note 8

An edge configuration server comprising:
a memory; and
at least one processor coupled to the memory and configured to:
 send to a User Equipment (UE) a service provisioning notification containing edge data network (EDN) configuration information for accessing an EDN; and
 receive a response message sent by the UE in response to the service provisioning notification containing the EDN configuration information.

Supplementary Note 9

The edge configuration server according to Supplementary Note 8, wherein the response message indicates successful receipt of the EDN configuration information.

Supplementary Note 10

The edge configuration server according to Supplementary Note 8, wherein the response message indicates whether or not the EDN configuration information was successfully received.

Supplementary Note 11

The edge configuration server according to Supplementary Note 8, wherein the response message indicates whether or not the EDN configuration information has been successfully configured or stored in the UE.

Supplementary Note 12

The edge configuration server according to any one of Supplementary Notes 8 to 11, wherein the at least one processor is configured to resend the service provisioning notification to the UE if the response message is not received or if the response message indicates a failure to receive.

Supplementary Note 13

The edge configuration server according to Supplementary Note 12, wherein the at least one processor is configured to send a notification to the UE prompting the UE to send a service provisioning unsubscribe request when the number of retransmissions of the service provisioning notification reaches a predetermined value.

Supplementary Note 14

The edge configuration server according to any one of Supplementary Notes 8 to 11, wherein the at least one processor is configured to send a notification to the UE prompting the UE to send a service provisioning unsubscribe request if the response message is not received, if the response message indicates a failure to receive, if the response message indicates a failure to configure, or if the response message indicates a failure to store.

Supplementary Note 15

The edge configuration server according to any one of Supplementary Notes 8 to 14, wherein the EDN configuration information contains a list of one or more edge enabler servers of the corresponding EDN.

Supplementary Note 16

A method performed by an edge configuration server, the method comprising:
sending to a User Equipment (UE) a service provisioning notification containing edge data network (EDN) configuration information for accessing an EDN; and
receiving a response message sent by the UE in response to the service provisioning notification containing the EDN configuration information.

Supplementary Note 17

A program for causing a computer to perform a method for an edge configuration server, the method comprising:
sending to a User Equipment (UE) a service provisioning notification containing edge data network (EDN) configuration information for accessing an EDN; and
receiving a response message sent by the UE in response to the service provisioning notification containing the EDN configuration information.

Supplementary Note 18

An edge configuration server comprising:
a memory; and
at least one processor coupled to the memory and configured to:
receive an edge enabler server (EES) registration update request from an EES; and
in response to the EES registration update request, send to the EES an EES registration update response containing first configuration information needs to be updated,
wherein the first information causes the EES to respond to a request message from an edge enabler client (EEC) of a User Equipment (UE) with a response message containing second information for the EEC to determine whether or not the EDN configuration information needs to be updated.

Supplementary Note 19

The edge configuration server according to Supplementary Note 18, wherein the first information and the second information each indicate one or both of a version and a release time and date of the EDN configuration information.

Supplementary Note 20

The edge configuration server according to Supplementary Note 18, wherein the first information and the second information each include an indication of an update of the EDN configuration information.

Supplementary Note 21

The edge configuration server according to any one of Supplementary Notes 18 to 20, wherein the second information is identical to the first information.

Supplementary Note 22

The edge configuration server according to any one of Supplementary Notes 18 to 21, wherein the at least one processor is configured to include the first information in the EES registration update response upon detecting that the UE is outside a service area of at least one EES different from the EES, based on location information of the UE and service area information of the at least one EES.

Supplementary Note 23

The edge configuration server according to any one of Supplementary Notes 18 to 22, wherein the at least one processor is configured to send additional information indicating one or more EECs or UEs associated with the first information to the EES via the EES registration update response.

Supplementary Note 24

The edge configuration server according to Supplementary Note 23, wherein the additional information is used by the EES to determine whether to include the second information in the response message to the EEC.

Supplementary Note 25

The edge configuration server according to any one of Supplementary Notes 18 to 24, wherein
the request message is an edge enabler client (EEC) registration request, an EEC registration update request, or an edge application server (EAS) discovery request, and
the response message is an EEC registration response, an EEC registration update response, or an EAS discovery response.

Supplementary Note 26

A method performed by an edge configuration server, the method comprising:
receiving an edge enabler server (EES) registration update request from an EES; and
in response to the EES registration update request, sending to the EES an EES registration update response containing first information for determining whether or not edge data network (EDN) configuration information needs to be updated,
wherein the first information causes the EES to respond to a request message from an edge enabler client (EEC) of a User Equipment (UE) with a response message containing second information for the EEC to determine whether or not the EDN configuration information needs to be updated.

Supplementary Note 27

A program for causing a computer to perform a method for an edge configuration server, the method comprising:

receiving an edge enabler server (EES) registration update request from an EES; and in response to the EES registration update request, sending to the EES an EES registration update response containing first configuration information needs to be updated, wherein the first information causes the EES to respond to a request message from an edge enabler client (EEC) of a User Equipment (UE) with a response message containing second information for the EEC to determine whether or not the EDN configuration information needs to be updated.

Supplementary Note 28

An edge enabler server (EES) comprising:

a memory; and at least one processor coupled to the memory and configured to:

send an edge enabler server (EES) registration update request to an edge configuration server (ECS);

receive from the edge configuration server an EES registration update response containing first information for determining whether or not edge data network (EDN) configuration information needs to be updated;

receive a request message from an edge enabler client (EEC) of a User Equipment (UE); and respond to the request message with a response message containing second information for the EEC to determine whether or not the EDN configuration information needs to be updated, wherein the second information causes the EEC to send a service provisioning request to the ECS to update the EDN configuration information.

Supplementary Note 29

The EES according to Supplementary Note 28, wherein the first information and the second information each indicate one or both of a version and a release time and date of the EDN configuration information.

Supplementary Note 30

The EES according to Supplementary Note 28, wherein the first information and the second information each include an indication of an update of the EDN configuration information.

Supplementary Note 31

The EES according to any one of Supplementary Notes 28 to 30, wherein the second information is identical to the first information, and the at least one processor is configured to forward the first information to the EEC as the second information.

Supplementary Note 32

The EES according to any one of Supplementary Notes 28 to 31, wherein the at least one processor is configured to include the second information in the response message when the request message indicates one or both of a version and a release time and date of the EDN configuration information held by the UE.

Supplementary Note 33

The EES according to any one of Supplementary Notes 28 to 32, wherein the at least one processor is configured to include the second information in the response message when the request message indicates a request for latest EDN configuration information.

Supplementary Note 34

The EES according to any one of Supplementary Notes 28 to 33, wherein the at least one processor is configured to:

receive from the edge configuration server, via the EES registration update response, additional information indicating one or more EECs or UEs associated with the first information; and determine, based on the additional information, whether or not to include the second information in the response message to the EEC.

Supplementary Note 35

The EES according to any one of Supplementary Notes 28 to 34, wherein the request message is an edge enabler client (EEC) registration request, an EEC registration update request, or an edge application server (EAS) discovery request, and the response message is an EEC registration response, an EEC registration update response, or an EAS discovery response.

Supplementary Note 36

A method performed by an edge enabler server (EES), the method comprising:

sending an edge enabler server (EES) registration update request to an edge configuration server (ECS);

receiving from the edge configuration server an EES registration update response containing first information for determining whether or not edge data network (EDN) configuration information needs to be updated;

receiving a request message from an edge enabler client (EEC) of a User Equipment (UE); and responding to the request message with a response message containing second information for the EEC to determine whether or not the EDN configuration information needs to be updated, wherein the second information causes the EEC to send a service provisioning request to the ECS to update the EDN configuration information.

Supplementary Note 37

A program for causing a computer to perform a method for an edge enabler server (EES), the method comprising:

sending an edge enabler server (EES) registration update request to an edge configuration server (ECS);

receiving from the edge configuration server an EES registration update response containing first information for determining whether or not edge data network (EDN) configuration information needs to be updated;

receiving a request message from an edge enabler client (EEC) of a User Equipment (UE); and responding to the request message with a response message containing second information for the EEC to determine whether or not the EDN configuration information needs to be updated, wherein the second information causes the EEC to send a service provisioning request to the ECS to update the EDN configuration information.

Supplementary Note 38

A User Equipment (UE) comprising:

a memory; and at least one processor coupled to the memory and configured to:

send a request message to an edge enabler server (EES);

receive from the EES a response message containing second information for determining whether or not edge data network (EDN) configuration information needs to be updated; and in response to determining, based on the second information, that the EDN configuration information needs to be updated, send a service provisioning request to an edge configuration server for updating the EDN configuration information.

Supplementary Note 39

The UE according to Supplementary Note 38, wherein the second information indicates one or both of a version and a release time and date of the EDN configuration information.

Supplementary Note 40

The UE according to Supplementary Note 38, wherein the second information includes an indication of an update of the EDN configuration information.

Supplementary Note 41

The UE according to any one of Supplementary Notes 38 to 40, wherein the request message indicates one or both of a version and a release time and date of the EDN configuration information held by the UE.

Supplementary Note 42

The UE according to any one of Supplementary Notes 38 to 41, wherein the request message indicates a request for latest EDN configuration information.

Supplementary Note 43

The UE according to any one of Supplementary Notes 38 to 42, wherein the at least one processor is configured to receive a service provisioning response sent by the edge configuration server in response to the service provisioning request, wherein the service provisioning response includes updated EDN configuration information.

Supplementary Note 44

The UE according to any one of Supplementary Notes 38 to 43, wherein the at least one processor is configured to send the service provisioning request to the edge configuration server without waiting for expiration of a lifetime of the EDN configuration information stored in the UE if the at least one processor determines, based on the second information, that the EDN configuration information needs to be updated.

Supplementary Note 45

The UE according to any one of Supplementary Notes 38 to 44, wherein the request message is an edge enabler client (EEC) registration request, an EEC registration update request, or an edge application server (EAS) discovery request, and the response message is an EEC registration response, an EEC registration update response, or an EAS discovery response.

Supplementary Note 46

A method performed by a User Equipment (UE), the method comprising:

sending a request message to an edge enabler server (EES);

receiving from the EES a response message containing second information for determining whether or not edge data network (EDN) configuration information needs to be updated; and in response to determining, based on the second information, that the EDN configuration information needs to be updated, sending a service provisioning request to an edge configuration server for updating the EDN configuration information.

Supplementary Note 47

A program for causing a computer to perform a method for a User Equipment (UE), the method comprising:

sending a request message to an edge enabler server (EES);

receiving from the EES a response message containing second configuration information needs to be updated; and in response to determining, based on the second information, that the EDN configuration information needs to be updated, sending a service provisioning request to an edge configuration server for updating the EDN configuration information.

Supplementary Note 48

A User Equipment (UE) comprising:

a memory; and at least one processor coupled to the memory and configured to:

act as an edge enabler client (EEC);

receive from an edge configuration server an updated list of edge data network (EDN) configuration information for one or more EDNs; and replace an entire old list of EDN configuration information already stored in the UE with the updated list.

Supplementary Note 49

The UE according to Supplementary Note 48, wherein the replacing includes deleting the old list and storing the updated list.

Supplementary Note 50

The UE according to Supplementary Note 48, wherein the replacing includes replacing includes invalidating the old list and validating the updated list.

Supplementary Note 51

The UE according to any one of Supplementary Notes 48 to 50, wherein the at least one processor is configured to notify an application client residing in the UE of an EDN configuration update.

Supplementary Note 52

A method performed by a User Equipment (UE), the method comprising:
  acting as an edge enabler client (EEC);
  receiving from an edge configuration server an updated list of edge data network (EDN) configuration information for one or more EDNs; and
  replacing an entire old list of EDN configuration information already stored in the UE with the updated list.

Supplementary Note 53

A program for causing a computer to perform a method for a User Equipment (UE), the method comprising:
  acting as an edge enabler client (EEC);
  receiving from an edge configuration server an updated list of edge data network (EDN) configuration information for one or more EDNs; and
  replacing an entire old list of EDN configuration information already stored in the UE with the updated list.

Supplementary Note 54

A User Equipment (UE) comprising:
a memory; and
at least one processor coupled to the memory and configured to:
  act as an edge enabler client (EEC);
  receive from an edge configuration server an updated list of edge data network (EDN) configuration information for one or more EDNs; and
  if old EDN configuration information for any of the one or more EDNs is stored in the UE, replace the old EDN configuration information with corresponding EDN configuration information included in the updated list.

Supplementary Note 55

The UE according to Supplementary Note 54, wherein the replacing includes deleting the old EDN configuration information and storing the corresponding EDN configuration information.

Supplementary Note 56

The UE according to Supplementary Note 54, wherein the replacing includes replacing includes invalidating the old EDN configuration information and validating the corresponding EDN configuration information.

Supplementary Note 57

The UE according to any one of Supplementary Notes 54 to 56, wherein the at least one processor is configured to maintain old EDN configuration information about another EDN, different from the one or more EDNs, stored in the UE.

Supplementary Note 58

The UE according to any one of Supplementary Notes 54 to 57, wherein the at least one processor is configured to, if old EDN configuration information for any of the one or more EDNs is not stored in the UE, newly store corresponding EDN configuration information included in the updated list.

Supplementary Note 59

The UE according to any one of Supplementary Notes 54 to 58, wherein the at least one processor is configured to notify an application client residing in the UE of an EDN configuration update.

Supplementary Note 60

A method performed by a User Equipment (UE), the method comprising:
  acting as an edge enabler client (EEC);
  receiving from an edge configuration server an updated list of edge data network (EDN) configuration information for one or more EDNs; and
  if old EDN configuration information for any of the one or more EDNs is stored in the UE, replacing the old EDN configuration information with corresponding EDN configuration information included in the updated list.

Supplementary Note 61

A program for causing a computer to perform a method for a User Equipment (UE), the method comprising:
  acting as an edge enabler client (EEC);
  receiving from an edge configuration server an updated list of edge data network (EDN) configuration information for one or more EDNs; and
  if old EDN configuration information for any of the one or more EDNs is stored in the UE, replacing the old EDN configuration information with corresponding EDN configuration information included in the updated list.

This application is based upon and claims the benefit of priority from Japanese Patent Application No. 2021-130984, filed on Aug. 10, 2021, the disclosure of which is incorporated herein in its entirety by reference.

REFERENCE SIGNS LIST

1 User Equipment (UE)
  2 Edge Enabler Client (EEC)
  3 Application client (AC)
  4 Edge Data Network (EDN)
  5, 5A, 5B Edge Enabler Server (EES)
  6 Edge Application Server (EAS)

7 Edge Configuration Server (ECS)
1103 Baseband Processor
1104 Application Processor
1106 Memory
1107 Modules
1202 Processor
1203 Memory
1204 Modules

What is claimed is:

1. A User Equipment (UE) comprising:

a memory; and at least one processor coupled to the memory and configured to:

receive, from an edge configuration server, a first service provisioning notification, wherein the first service provisioning notification includes edge data network (EDN) configuration information, and wherein the EDN configuration information includes a list of at least one Edge Enabler Server (EES); and send, to the edge configuration server, a response message that is configured to cause the edge configuration server to send a second service provisioning notification.

2. The UE according to claim 1, wherein the response message indicates information related to failure.

3. The UE according to claim 2, wherein the response message includes information regarding a cause of the failure to receive the EDN configuration information.

4. The UE according to claim 2, wherein the response message includes information regarding a cause of the failure to configure or store the EDN configuration information.

5. A method performed by a User Equipment (UE), the method comprising:

receiving, from an edge configuration server, a first service provisioning notification, wherein the first service provisioning notification includes edge data network (EDN) configuration information, and wherein the EDN configuration information includes a list of at least one Edge Enabler Server (EES); and sending, to the edge configuration server, a response message that is configured to cause the edge configuration server to send a second in service provisioning notification.

6. The method according to claim 5, wherein the EDN configuration information includes at least one of information indicating one or more topological areas associated with the edge configuration server, information indicating a Data Network (DN), or information indicating an Access Point Name (APN).

7. The method according to claim 5, wherein the first service provisioning notification is received in a case where an event occurs at the edge configuration server that satisfies trigger conditions for updating service provisioning of the UE.

8. The method according to claim 5, wherein the second service provisioning notification includes the EDN configuration information.

9. An edge configuration server comprising:

a memory; and at least one processor coupled to the memory and configured to:

send, to a User Equipment (UE), a first service provisioning notification, wherein the first service provisioning notification includes edge data network (EDN) configuration information, and wherein the EDN configuration information includes a list of at least one Edge Enabler Server (EES);

receive a response message sent by the UE; and based on receiving the response message, send a second service provisioning notification.

10. The edge configuration server according to claim 9, wherein the response message indicates information related to failure.

11. The edge configuration server according to claim 10, wherein the response message includes information regarding a cause of the failure by the UE to receive the EDN configuration information.

12. The edge configuration server according to claim 10, wherein the response message includes information regarding a cause of the failure by the UE to configure or store the EDN configuration information.

13. The edge configuration server according to claim 9, wherein the at least one processor is configured to send a notification to the UE prompting the UE to send a service provisioning unsubscribe request when a number of retransmissions of the service provisioning notification reaches a predetermined value.

14. The edge configuration server according to claim 9, wherein the at least one processor is configured to send a notification to the UE prompting the UE to send a service provisioning unsubscribe request if the response message is not received, if the response message indicates a failure to receive, if the response message indicates a failure to configure, or if the response message indicates a failure to store.

\* \* \* \* \*